(12) United States Patent
Jeong et al.

(10) Patent No.: US 8,948,100 B2
(45) Date of Patent: Feb. 3, 2015

(54) METHOD AND APPARATUS FOR OPERATING MULTI-USER COLLABORATIVE SPATIAL MULTIPLEXING IN WIRELESS COMMUNICATION SYSTEM

(75) Inventors: Su-Ryong Jeong, Suwon-si (KR); Jeong-Ho Park, Seoul (KR); Tae-Young Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 13/011,062

(22) Filed: Jan. 21, 2011

(65) Prior Publication Data

US 2011/0176501 A1    Jul. 21, 2011

(30) Foreign Application Priority Data

Jan. 21, 2010  (KR) .......................... 10-2010-0005783

(51) Int. Cl.
| | |
|---|---|
| *H04W 4/00* | (2009.01) |
| *H04L 12/66* | (2006.01) |
| *H04J 1/00* | (2006.01) |
| *H04J 3/00* | (2006.01) |
| *H04W 72/12* | (2009.01) |
| *H04L 5/00* | (2006.01) |
| *H04W 72/04* | (2009.01) |

(52) U.S. Cl.
CPC ......... *H04W 72/1226* (2013.01); *H04L 5/0023* (2013.01); *H04L 5/0032* (2013.01); *H04L 5/0035* (2013.01); *H04L 5/0037* (2013.01); *H04W 72/046* (2013.01); *H04W 72/1268* (2013.01)
USPC ............ 370/329; 370/352; 370/343; 370/345

(58) Field of Classification Search
USPC ......................................................... 370/329
See application file for complete search history.

(56) References Cited

U.S. PATENT DOCUMENTS

| | | | | |
|---|---|---|---|---|
| 2010/0128687 | A1* | 5/2010 | Oteri et al. ..................... | 370/329 |
| 2010/0220683 | A1* | 9/2010 | Novak et al. ................... | 370/330 |
| 2011/0149942 | A1* | 6/2011 | Ko et al. ........................ | 370/343 |

* cited by examiner

*Primary Examiner* — Noel Beharry

(57) ABSTRACT

A method and an apparatus operate multi-user Collaborative Spatial Multiplexing (CSM) in a wireless communication system. A Base Station (BS), performs uplink transmission scheduling on multiple Mobile Stations (MSs). Resources units, which have been allocated to multiple layers spatially discriminated by the uplink transmission scheduling, are permutated by applying different permutation schemes according to layers. Uplink data is received from the scheduled MSs through the permutated resource units. Each MS uses permutation schemes according to the layers allocated in a manner corresponding to the BS. Therefore, when the multi-user CSM is used, self-interferences or interferences between layers are averaged, thereby reducing variable widths of parameters of various kinds and improving the prediction property of a received SINR. As a result, a Packet Error Ratio (PER) performance is improved when data is actually transmitted.

28 Claims, 14 Drawing Sheets

```
void permutation(int array_size, int seed, int *index_array)
{
    int  d1, d2;
    int  i, p, q;
    int  swap_buffer;

d1 = (seed>>5) + 619;
    d2 = seed & ((1<<5)-1);

p=-1;
    for (i=array_size-1; i>1; i--)
     {
         p = p+i;
         q = ((d1*p + d2)    %1031) % array_size;

if((q>=i)) q=q    %(i+1);

swap_buffer=index_array[q];
         index_array[q]=index_array[i];
         index_array[i]=swap_buffer;
     }
    swap_buffer=index_array[0];
    index_array[0]=index_array[1];
    index_array[1]=swap_buffer;
}
```

FIG.4

METHOD AND APPARATUS FOR OPERATING MULTI-USER COLLABORATIVE SPATIAL MULTIPLEXING IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application entitled "Method and Apparatus for Operating Multi-User Collaborative Spatial Multiplexing in Wireless Communication System" filed in the Korean Intellectual Property Office on Jan. 21, 2010 and assigned Serial No. 10-2010-0005783, the contents of which are incorporated herein by reference.

TECHNICAL FIELD OF THE INVENTION

The present invention relates to a wireless communication system and, more particularly, to a method and an apparatus for operating a Collaborative Spatial Multiplexing (CSM) for multiple users.

BACKGROUND OF THE INVENTION

Research has been conducted on a means for improving the quality of a transmission channel or extending a transmission channel in order to increase a data transmission capacity in a wireless communication system. As one of various means for improving the quality of a transmission channel and increasing a transmission capacity, there is a scheme capable of transmitting an even larger amount of data at one time over the same transmission channel by improving a Signal to Interference and Noise Ratio (SINR), which is a parameter for indicating the quality of the transmission channel.

The concept of the SINR scheme as described above is expressed by Equation 1 below.

$$SINR = \frac{p_{serv}}{\sum_i I_{OS(i)} + \text{Noise}} \quad [\text{Eqn. 1}]$$

where $P_{serv}$ represents the strength of a signal received from a serving Base Station (BS) to a Mobile Station (MS). $I_{OS(i)}$ represents the strength of an interference signal that the MS received from the $i^{th}$ interference cell (i.e. other cells/sectors). Noise represents the strength of a noise among the received signals.

Therefore, the quality of the transmission channel can be improved when the strength of a received signal is increased by reducing the strength of an interference signal received from each interference cell, or by increasing the strength of a transmission signal from a serving BS. As the SINR is improved, a larger amount of data may be transmitted over the improved transmission channel.

Meanwhile, a Spatial Multiplexing (SM) technology can be used as a means for extending the transmission channel. It signifies the technology of generating an additional transmission space or layer by using a multi-antenna technology and then increasing a data transmission capacity through the generated additional transmission space or layer for the same time-frequency space.

When the SM technology is used, there is an advantage due to the extension of the additional transmission space or layer although an additional frequency use is added to the same time-frequency space. Due to the additional frequency use, a self-interference $I_{self}$ is additionally generated. An SINR including self-interference $I_{self}$ is expressed by Equation 2 below.

$$SINR = \frac{p_{serv}}{I_{self} + \sum_i I_{OS(i)} + \text{Noise}} \quad [\text{Eqn. 2}]$$

As can be seen in Equation 2, the SM technology is unavoidably associated with an additional self-interference $I_{self}$ when data is transmitted. Accordingly, the SM technology is effective when other sector interferences $I_{OS(i)}$, which are interferences from other BSs (i.e. interference cells), are small or a strength $P_{serv}$ of a received signal with respect to a self-BS (i.e. a serving BS) is large.

Meanwhile, uplink wireless communication from a MS is different from that of downlink wireless communication from a BS because transmission power of a MS is limited, and also because power should be split for each antenna and a split power should be transmitted to each MS. In this regard, the SM technology has limits on its use.

Accordingly, in order to increase a transmission capacity while overcoming the limit of the transmission power of the MS, use is made of multi-user CSM (Collaborative Spatial Multiplexing), in which for an uplink, it is not a single MS that transmits data to the uplink but at least one MS is allocated to the same resources.

Also, when the multi-user CSM technology is used, similarly to when the SM technology is used, as other sector interferences $I_{OS(i)}$ (which are interferences from other BSs) is reduced or as the signal strength $P_{serv}$ of a self-BS is increased, the performance of the multi-user CSM improves. Additionally, in a receiver, an additional internal radio wave interference is added, and therefore, self-interference (or interference between layers) $I_{self}$ occurs. Hence, the receiver needs to properly control the occurrence of the self-interference.

SUMMARY OF THE INVENTION

To address the above-discussed deficiencies of the prior art, it is a primary object to provide a method and an apparatus for multi-user allocation and layer implementation when multi-user CSM is used in an uplink of a wireless communication system.

Also, the present invention provides a method and an apparatus for averaging self-interferences or interferences between layers when multi-user CSM is used in an uplink of a wireless communication system.

Furthermore, the present invention provides a method and an apparatus for configuring channels between an existing layer and additional layers in different schemes when multi-user CSM is used in an uplink of a wireless communication system.

In accordance with an aspect of the present invention, a method for operating multi-user Collaborative Spatial Multiplexing (CSM) in a wireless communication system is provided. The method includes performing uplink transmission scheduling on multiple Mobile Stations (MSs). Resources units, which have been allocated to multiple layers spatially discriminated for the multi-user CSM by the uplink transmission scheduling, are permutated by applying different permutation schemes according to layers. And uplink data is received from scheduled MSs through the permutated resource units.

In accordance with another aspect of the present invention, a Base Station (BS) apparatus for operating multi-user Collaborative Spatial Multiplexing (CSM) in a wireless communication system is provided. The BS apparatus includes an uplink transmission scheduler configured to perform uplink transmission scheduling on multiple Mobile Stations (MSs). A demultiplexer is configured to permutate resource units, which have been allocated to multiple layers spatially discriminated for the multi-user CSM by the uplink transmission scheduling, by applying different permutation schemes according to layers, and receiving uplink data, which is mapped into the permutated resource units, from the scheduled MSs. And a decoder is configured to decode the uplink data.

In accordance with another aspect of the present invention, a method for operating multi-user Collaborative Spatial Multiplexing (CSM) in a wireless communication system is provided. The method includes receiving channel allocation information according to uplink transmission scheduling from a Base Station (BS), by a Mobile Station (MS). Resource units allocated to the MS based on the channel allocation information are permutated by applying a relevant permutation scheme to a layer allocated to the MS among spatially-discriminated multiple layers. And uplink data is transmitted to the BS through the permutated resource units, where resource units allocated to the multiple layers are permutated by using different permutation schemes according to the layers.

In accordance with yet another aspect of the present invention, a Mobile Station (MS) apparatus for operating multi-user Collaborative Spatial Multiplexing (CSM) in a wireless communication system is provided. The MS apparatus includes an MAP receiver is configured to receive channel allocation information according to uplink transmission scheduling from a Base Station (BS) through a MAP message. An encoder is configured to encode uplink data desired to be transmitted. And a multiplexer is configured to permutate resource units allocated to the MS based on the channel allocation information by applying a relevant permutation scheme to a layer allocated to the MS among spatially-discriminated multiple layers, map the encoded data into the permutated resource units, and transmit the encoded data mapped into the permutated resource units to the BS. The resource units allocated to the multiple layers are permutated by using different permutation schemes according to layers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is an illustrative view of an example of a function algorithm expressing an applicable permutation equation according to an embodiment of the present invention;

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. In the following description of the present invention, a description will be made for parts which are necessary for understanding the operation of the present invention. The background art other than the parts that are necessary for understanding the present invention will be omitted so as to not obscure the subject matter of the present invention.

A multi-user allocation operation in a wireless communication system will be described with reference to a communication standard based on the IEEE 802.16e in the present disclosure. However, the operation according to the present invention is not limited to a particular communication protocol or a particular system configuration. It will be apparent to those skilled in the art that various changes in form and details may be made which does not depart from the subject matter and scope of the present invention. Embodiments of the present invention, which will be described in detail as follows, may be applied to a situation in which multi-user CSM is used in an uplink of a wireless communication system.

The multi-user CSM technology may be used to increase a transmission capacity in the uplink of the wireless communication system. The multi-user CSM technology refers to a technology in which at least two different users share a transmission domain occupying the same time-frequency and utilize the shared transmission domain as a transmission channel.

Figure 1:
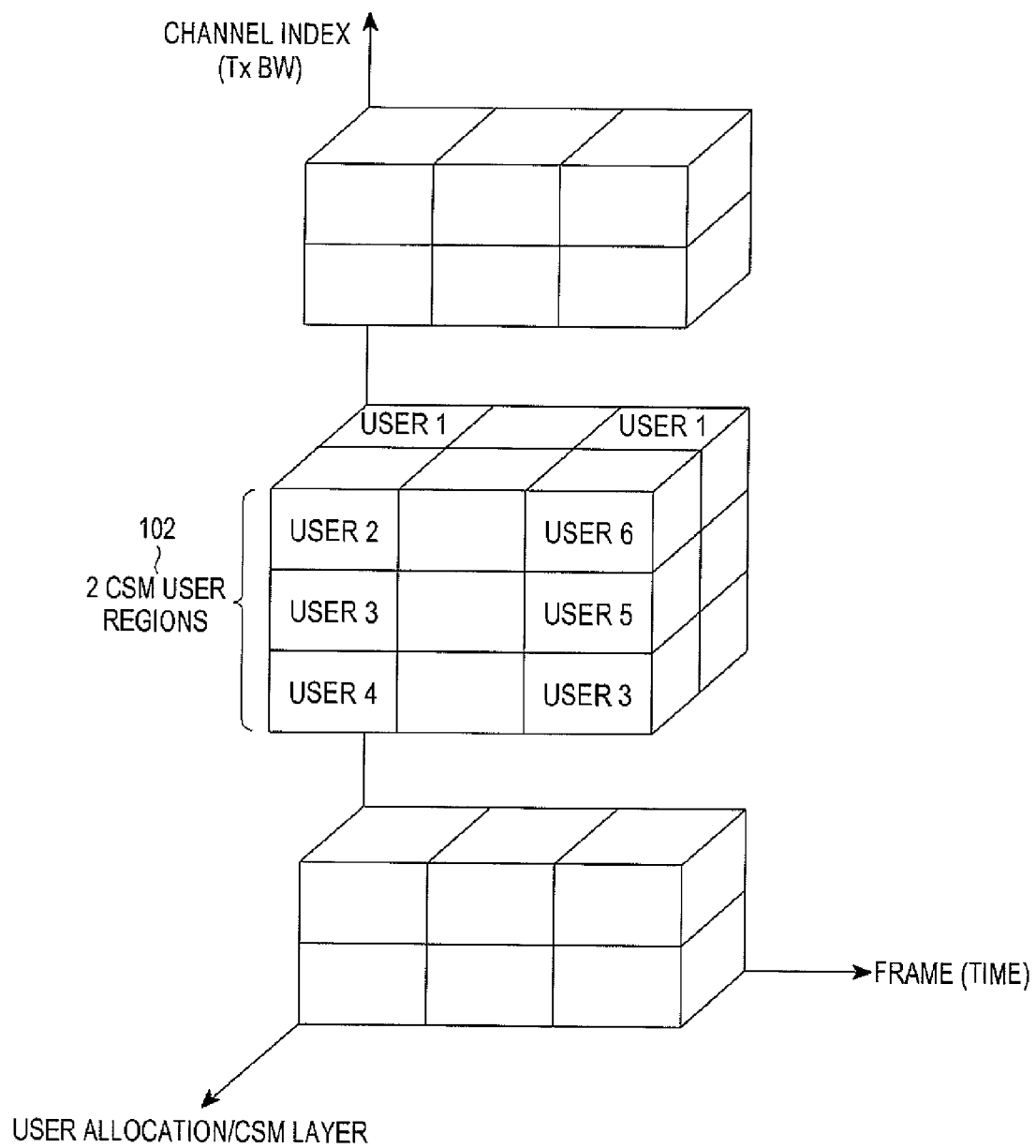
FIG. 1 is an illustrative view of a resource structure according to multi-user CSM.

FIG. 1 is an illustrative view of a resource allocation structure according to multi-user CSM.

As illustrated in FIG. 1, when the multi-user CSM is used, one or more CSM layers may additionally exist in a two-dimensional resource structure which is identified by a channel index corresponding to the frequency axis (i.e. the frequency domain) and a frame corresponding to the time axis (i.e. the time domain). A partial band 102 or the entire band of the entire transmission Bandwidth (Tx BW) on the frequency axis may be used as a CSM user domain. In the CSM user domain, as illustrated in FIG. 1, a first layer is allocated to a user 1 (i.e. an MS 1), and a second layer is allocated to users 2 to 6 (i.e. MSs 2 to 6), each of which is paired with user 1 within a relevant time-frequency space. FIG. 1 illustrates an example in which the first layer is allocated to user 1. However, the first layer may be allocated to one or more random users according to scheduling of a BS. In contrast, only one layer is allocated to a remaining domain.

Tasks that should be considered in using the multi-user CSM technology include how to select different user pairs using the same resources, and how to predict and control self-interference or interference between CSM layers which occurs when the different user pairs have been selected and the multi-user CSM is used for the different selected user pairs. Embodiments for solving the tasks will be described as follows.

In an embodiment, there is a random allocation (i.e. random pairing) in which user pairs are randomly allocated without consideration of self-interferences between users according to a sequential order that a scheduler allocates.

In this embodiment, the scheduler follows an optimized user allocation algorithm as is. Therefore, there is no need for a complex algorithm for user pair selection (i.e. user-pairing), such that the resource structure becomes simplified. Also, due to the simplified resource structure, special additional channel state information and transmission information are not additionally necessary. In contrast, user pair selection is not optimized, and therefore, performance degradation occurs. Moreover, each user combination, which becomes a pair, is changed at each transmission frame, such that a received SINR value, including a self-interference amount, is changed. As a result, prediction accuracy degrees of parameters of various kinds for transmission are reduced.

In another embodiment, users who may become pairs are combined for the number of all pairs, a transmission capacity is computed in each pair, and a combination of pairs, which has the largest transmission capacity among all the combinations of pairs, is allocated.

In another embodiment as described above, a transmission capacity may be maximized, and a high transmission efficiency may be obtained. However, a transmission capacity should be predicted through computation for the number of all pairs. Therefore, the prediction of the transmission capacity needs additional information (e.g. channel state information and transmission information) and a prediction algorithm. Furthermore, in an uplink, the delay of a predetermined time occurs when MSs communicate channel state information and a BS collects the channel state information. Due to the occurrence of the delay, the accuracy degree of scheduling is reduced. Therefore, it is also difficult to expect the maximum amount of performance improvement in this embodiment.

Hence, even though the embodiments as described above are used, actual improvement in performance is not significant. Specifically, users who become pairs are changed at each frame, and along with the change, data communication parameters, including a received SINR, a Modulation and Coding Scheme (MCS) level, channel quality, and such, which are for data transmission, are also changed. Due to the changes of the data communication parameters, the prediction of data communication is changed, causing a high transmission failure rate.

Figure 2:
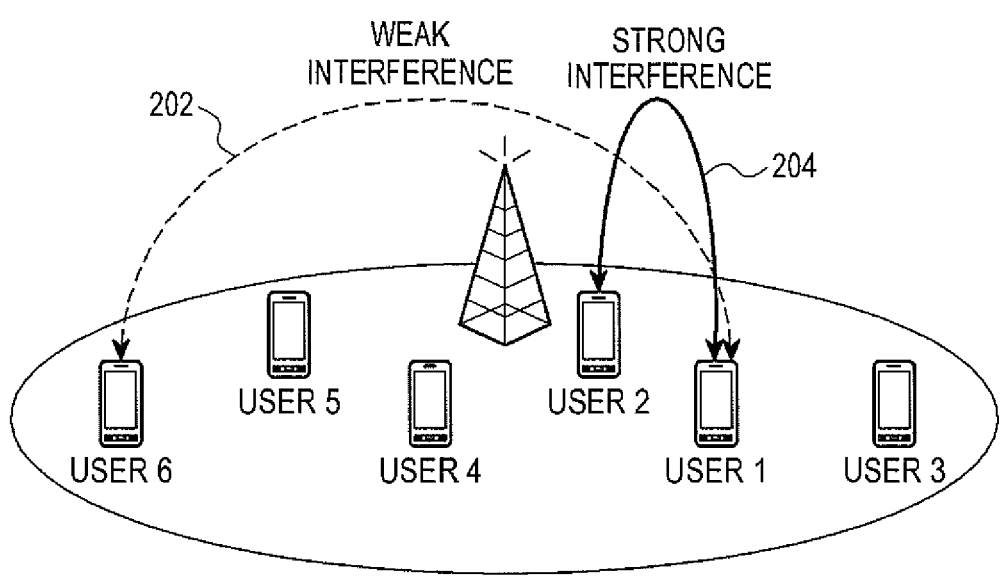
FIG. 2 is an illustrative view of an interference change in a situation in which a user pair is changed for each frame when multi-user CSM is used.

FIG. 2 is an illustrative view of an interference change in a situation in which a user pair is changed for each frame when the multi-user CSM is used. FIG. 2 illustrates an example in which a user 1 is paired with a user 2 at a particular frame 204, and is paired with a user 6 at a next frame 202.

As illustrated in FIG. 2, user 1 is paired with user 2, who has a high received power from a BS, at previous frame 204, and is paired with user 6, who has low received power from the BS, at next frame 202. In this situation, a difference in interference magnitude occurs between frames. Due to the difference of the interference magnitude, channel parameters or allocation information, and such, which have been measured at a previous frame, become(s) invalid at a next frame. Therefore, this invalidation causes the occurrence of power loss or data loss at the next frame.

Hereinafter, an apparatus and a method are described which can stably transmit data and can increase a transmission capacity while not making a system complex when transmitting data by using the multi-user CSM technology through an uplink. Specifically, in an embodiment of the present invention, self-interferences are averaged over values with respect to all users no matter which user pairs are selected. Therefore, it is possible to reduce the complexity of a scheduler, reduce overhead with respect to additional channel parameters, and reduce a packet error rate.

Specifically, when multi-user CSM is used in the uplink of the wireless communication system, at least one user or layer is additionally allocated in such a manner as to average interferences between layers (i.e. self-interferences at the viewpoint of a reception end) with respect to an existing user or layer. This is for improving the prediction property and reliability of channel quality and performance when resources are allocated.

To this end, multi-user allocation is performed such that users that are allocated to the additional layer (i.e. the layer after the second layer) in order to become pairs may not be designated for each transmission space of a user that is allocated to the existing layer (i.e. the first layer) and is used, and such that one or more MSs may become pairs. Specifically, a permutation scheme, which is different from the one applied to the existing layer, is applied to each additional layer. Therefore, channel structures between layers become different, such that self-interference is not made up of a value with respect to a particular MS, but rather values with respect to multiple different MSs. A self-interference magnitude with respect to the particular MS is averaged over all MSs.

Figure 3:
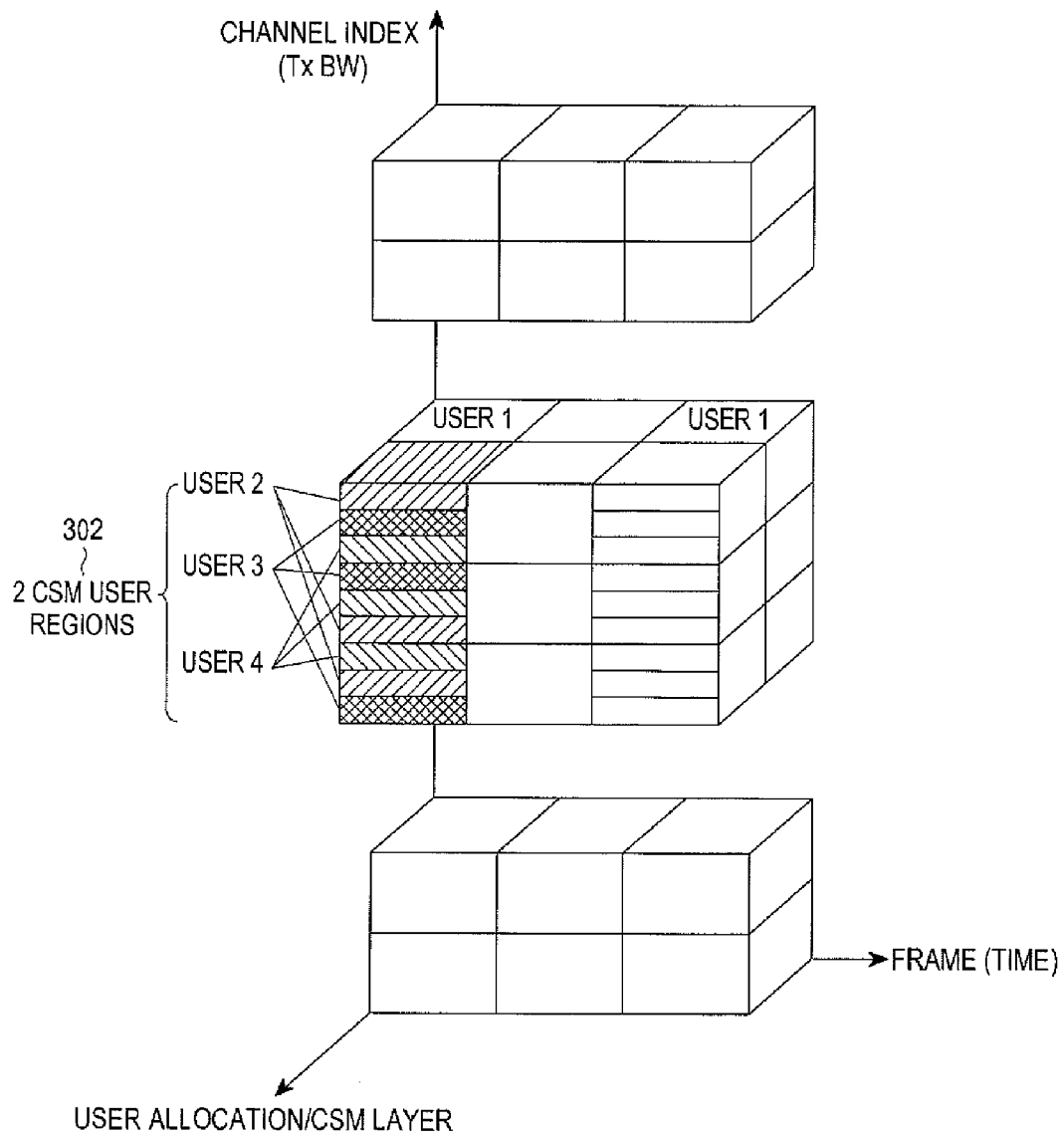
FIG. 3 is an illustrative view of a resource structure for self-interference averaging in multi-user CSM according to an embodiment of the present invention.

FIG. 3 is an illustrative view of a resource allocation for averaging self-interferences in the multi-user CSM according to an embodiment of the present invention.

As illustrated in FIG. 3, two CSM layers exist in a CSM user domain 302 which may become a partial or the entire band in a two-dimensional resource structure which is identified by a channel index corresponding to the frequency axis and a frame corresponding to the time axis. A first layer is allocated a user 1 (i.e. an MS 1), and a second layer is allocated users 2 to 4 (i.e. MSs 2 to 4), each of which is paired with user 1. At this time, a frequency resource permutation scheme (i.e. a permutation pattern, a permutation equation, a parameter used for the permutation equation, and such), which is different from the one applied to the first layer, is applied to the second layer which is allocated users 2 to 4. Therefore, it can be seen that locations of resource units for each user on the frequency axis are mixed in CSM user domain 302. FIG. 3 illustrates an example in which the first layer is allocated only to user 1. However, it goes without saying that the first layer may be allocated to one or more random users according to scheduling of a BS.

As described above, a permutation scheme, which is different from the one applied to the existing layer, is applied to the additional CSM layer. Therefore, averages of self-interference values by users 2, 3, and 4, who exist in the additional CSM layer, are applied to user 1 who exists in the existing CSM layer. Accordingly, prediction errors of channel parameters or self-interferences are reduced with respect to the next frame.

Hereinafter, an operation and configuration of a BS will be described according to an embodiment of the present invention.

A BS communicates a resource domain, to which self-interference averaging is to be applied, to each MS that connects to the relevant BS. Embodiments, which can be used to this end, are as follows.

In an embodiment, when a system is initially configured, a multi-user CSM domain for self-interference averaging (i.e. a self-interference averaging domain) may be defined by using Resource Units (RUs) which include a particular frequency band, a particular time, at least one frame, at least one subframe, at least one subchannel, at least one Logical Resource Unit (LRU), and such. The definition may be determined based on the intention of a communication protocol standard, a system designer, or a system operator. Thereby, the BS and MSs can share the self-interference averaging domain without delivering a special signal between the BS and MSs which connect to the relevant BS. In an embodiment, the entire system band may be designated as the multi-user CSM domain.

In some embodiments, each BS communicates the multi-user CSM domain for self-interference averaging to MSs that connect to the relevant BS through a periodically-transmitted signal or channel. At this time, a broadcasting channel designated by the system, or message data which is designated by an MAP message indicating resource allocation and can be analyzed by all MSs, including a Super Frame Header (SFH) signal, a Frame Header (FH) signal, or a preamble signal which can be used to transmit predetermined information, can be used as the signal or channel. Also, information that indicates the multi-user CSM domain for self-interference averaging (i.e. the self-interference averaging domain) may be designated based on an index of a particular frequency band, an index of a particular time, an index of at least one frame, an index of at least one subframe, an index of at least one Logical Resource Unit (LRU), and such. In an embodiment, the entire system band is designated as the multi-user CSM domain, or the notification of the multi-user CSM domain may be omitted when the multi-user CSM domain is previously agreed upon between a BS and an MS.

Also, the BS shares with MSs within the relevant BS how to perform the permutation of frequency resources with respect to the self-interference averaging domain. Similarly to the embodiments for sharing the self-interference averaging domain, embodiments that can be used such that the BS and MSs may share the permutation scheme are as follows. In an embodiment, the permutation scheme is determined when the system is initially configured. In another embodiment, the permutation scheme is communicated by using a signal or channel which is periodically or aperiodically transmitted from the BS to the MSs.

Also, when the BS receives an uplink signal, i.e. when each MS performs transmission in a self-interference averaging multi-user CSM scheme according to the embodiment for sharing the permutation scheme and related information, different permutation schemes may be applied to layers according to the embodiment for sharing the permutation scheme, respectively. Then, the BS receives the uplink signal and decodes and datalizes the received uplink signal.

The permutation scheme as described above will be described in more detail as follows.

In order to obtain the diversity gain of a transmission channel, a wireless communication system pseudo-randomly mixes resource units, including a tone, a tile, and/or a particular cluster, which belong to the transmission channel, with respect to the entire transmission band. This type of operation is called a "permutation for the channel."

A transmission side performs a permutation through a multiplexer. A receiver reconfigures permutated resource units on a channel-by-channel basis through a demultiplexer. At this time, the permutation changes an array of indexes of a tone, a tile, and/or a cluster, which is arranged in a predetermined order, to another array of the indexes, which is obtained by rearranging the array of the indexes in a new order according to a predetermined scheme. An example of a permutation equation for the change as described above is expressed by Equation 3 below.

$$Y = P(n, \text{seed}(ID\_cell), X)$$ [Eqn. 3]

where X represents an array which includes indexes of a tone, a tile, and/or a cluster, which are transmitted. n, which is the size of an X array, represents the number of resource unit indexes included in the X array. ID_cell represents a unique cell Identifier (ID) that is necessary for discriminating between cells. seed(ID_cell) represents a unique cell number that is based on the cell ID and is applied as a seed value of a pseudo-random generator. Also, P is a function that expresses a permutation equation for mixing the indexes of the X array in a pseudo-random manner when a given seed(ID_cell) is set as a seed value. Y represents an array of a series of resource unit indexes which is a result obtained by mixing the indexes of the tone, tile, and/or cluster within the given X array in the pseudo-random manner.

Therefore, a given signal is transmitted through a resource unit that includes an index location stored in Y[i] corresponding to the $i^{th}$ element of Y, instead of being transmitted through a resource unit that includes an index location stored in X[i] corresponding to the $i^{th}$ element of X. Therefore, each user may transmit data and control signals through resource units (i.e. a tone, a tile, and/or a cluster) that are uniquely and pseudo-randomly mixed.

Meanwhile, a demultiplexer of a receiver receives signals, which have been transmitted in a form permutated by the permutation equation as expressed by Equation 3, through an inverse operation of the permutation. Doing this reconfigures the data channel. Namely, the demultiplexer stores both arrays X and Y according to the permutation equation as expressed by Equation 3 and corresponding locations of resource units stored in each of the arrays X and Y. Then, the demultiplexer inversely permutates a resource unit, which has been permutated into a location stored in Y[j] and then has been transmitted, to a location stored in X[i], and receives the inversely-permutated resource unit. Thereby, it reconfigures the data channel from the received signals.

FIG. 4 is an illustrative view of an example of a function algorithm expressing an applicable permutation equation according to an embodiment of the present invention. As shown in FIG. 4, when array_size representing the size of an array and a seed value are input to the permutation equation, the permutation equation mixes indexes included in an array. Thereby, it provides index_array which is a storage place for storing a result obtained by permutating the input array in a permutation algorithm.

Figure 5A:
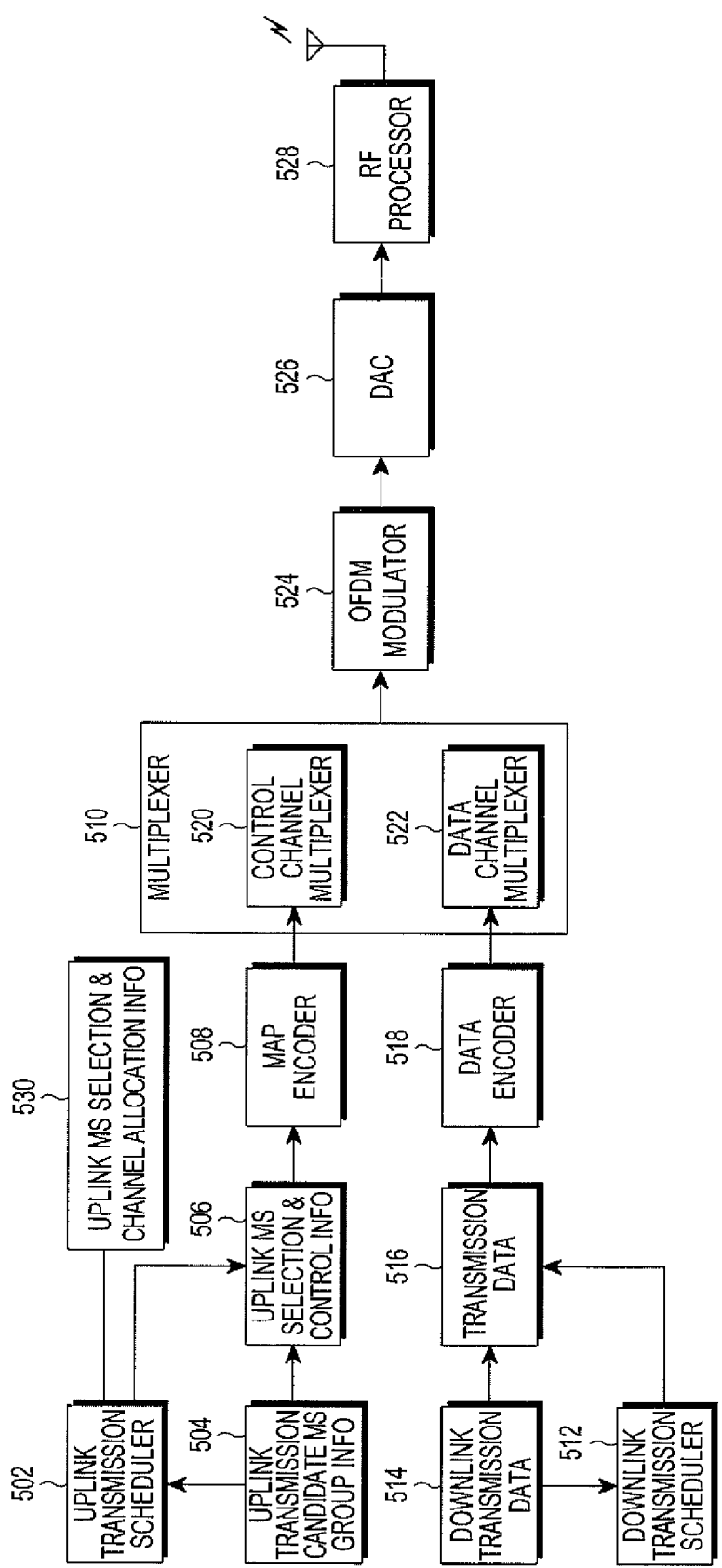
FIGS. 5A and 5B are block diagrams illustrating transmission and reception configurations of a Base Station (BS) in a wireless communication system according to an embodiment of the present invention.
Figure 5B:
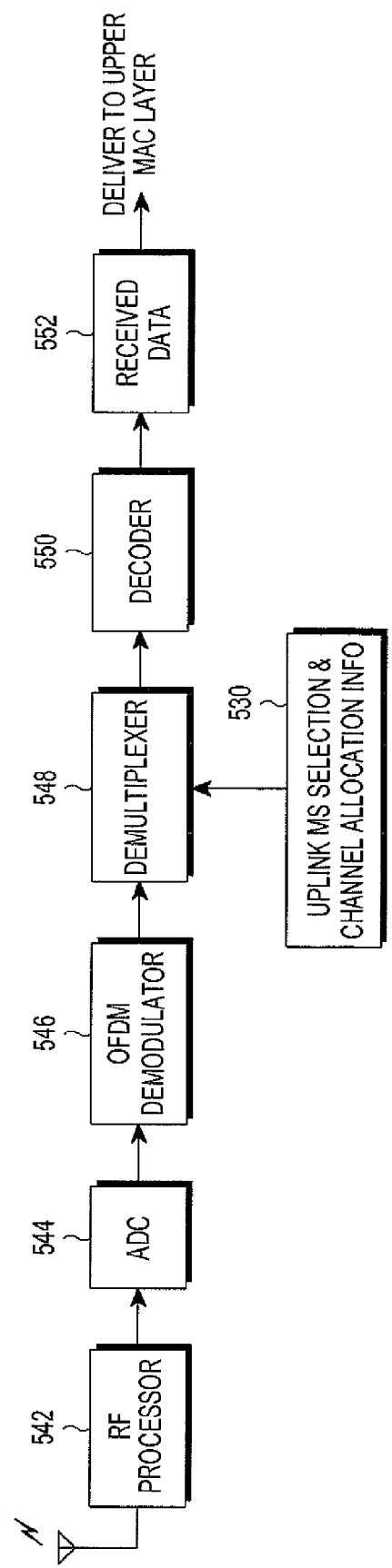

FIGS. 5A and 5B are block diagrams illustrating transmission and reception configurations of a BS in a wireless communication system according to an embodiment of the present invention.

Referring to FIG. 5A, an uplink transmission scheduler 502 schedules transmission candidate MSs with reference to information 504 on the transmission candidate MSs of an uplink, and selects MSs that are to perform uplink transmission. The uplink transmission scheduler 502 generates MS selection and control information 506 indicating the selected MSs, a layer allocated the selected MSs, and/or a permutation scheme, and such, and provides the generated MS selection and control information 506 to an MAP encoder 508. At this time, uplink MS selection and channel allocation information 530, which is generated based on the result of the scheduling, is provided to a reception path. MAP encoder 508 generates a MAP message by using other pieces of information, which are necessary for generating the MAP message, along with the MS selection and control information 506. Then, the MAP encoder 308 provides the generated MAP message to control channel multiplexer 520 of a multiplexer 510.

When there is downlink transmission data 514 to be transmitted from the BS to at least one MS, transmission data 516, which is selected by scheduling of a downlink transmission scheduler 512 among multiple pieces of downlink transmission data 514, is input to a data encoder 518. Data encoder 518 encodes transmission data 516 in a predetermined encoding scheme, and provides the encoded transmission data to data channel multiplexer 522 of multiplexer 510.

Control channel multiplexer 520 and data channel multiplexer 522 of multiplexer 510 multiplex input data, and map appropriate resources into the relevant channel and the relevant user/layer. At this time, when the need arises, data input by a particular user is mapped into a channel to which permutation is applied.

Output data from multiplexer 510 is OFDM-modulated by an Orthogonal Frequency Division Multiplexing (OFDM) modulator 524. The OFDM-modulated data is converted to an analog data signal by a Digital to Analog Converter (DAC) 526. The analog data signal is converted to a Radio Frequency (RF) data signal, and is mixed and carried with/by an RF carrier while going through an RF processor 528. The RF processor 528 transmits the RF data signal carried by the RF carrier to each MS through an antenna.

Referring to FIG. 5B, an analog RF signal, which is transmitted from each MS and is received by the BS, is converted to an analog baseband signal by an RF processor 542. The analog baseband signal is converted to a digital signal by an Analog to Digital Converter (ADC) 544. The digital signal goes through an OFDM demodulator 546, and is input to a demultiplexer 548. Demultiplexer 548 separates output data from OFDM demodulator 546 into a control channel and a data channel with reference to uplink MS selection and channel allocation information 530 determined by uplink transmission scheduler 502. Data corresponding to the data channel is recovered as received data 552 by a decoder 550. The received data 552 is delivered to an upper Media Access Control (MAC) layer.

In the transmission and reception configurations of the BS of FIGS. 5A and 5B, a component for performing the permutation is multiplexer 510. Multiplexer 510 permutates and maps data to be transmitted in a previously-agreed permutation scheme and multiplexes the data. For example, referring to Equation 3, an input of the permutation becomes the X array and a result of the permutation becomes the Y array in the multiplexer 510. X[i], which is the $i^{th}$ resource unit of X, is mapped into corresponding X[j] which is the $j^{th}$ resource unit of Y, by the permutation equation. A component for receiving the channel data, which has been permutated and then has been transmitted, is demultiplexer 548. Demultiplexer 548 inversely permutates and demaps the received data according to an inverse operation of multiplexer 510 and inversely multiplexes it. As an example, referring to Equation 3, an input of demultiplexer 548 becomes the Y array, and a result of the inverse permutation becomes the X array. Therefore, Y[j], which is the $j^{th}$ resource unit of Y, is demapped into a location corresponding to X[i] which has been previously obtained with respect to Y[j]. Information on permutation and MS selection at each frame may be defined by a system configuration. Alternatively, the information may be delivered to each MS through a MAP message or other messages.

Permutation may be applied to all resource units for the transmission of control information and data, and permutation for self-interference averaging may be additionally applied to resource units in a multi-user CSM domain. Hereinafter, an example of a permutation equation for self-interference averaging will be described according to an embodiment of the present invention.

In the X array as defined by Equation 3, indexes of a tone, a tile, and/or a cluster corresponding to a self-interference averaging domain shared between a BS and an MS are gathered, and a new array X' can be configured. Namely, indexes of a tone, a tile, and/or a cluster, which are all resource units belonging to X', all indicate locations of resources belonging to the self-interference averaging domain.

The relation between array X before permutation and array X' is defined by Equation 4 below.

$$X'[j]=X[i] \qquad [\text{Eqn. 4}]$$

where i represents a resource unit index belonging to array X with respect to the entire band. The range of i is limited to belong to the self-interference averaging domain. Also, j represents a resource unit index belonging to array X' with respect to the self-interference averaging domain. Accordingly, each resource unit, which belongs to the self-interference averaging domain, has an index i in array X with respect to the entire band and an index j in array X' with respect to the self-interference averaging domain.

An example will be described as follows. A total of ten ('10') resource units, which are identified by the numbers zero ('0') to nine ('9') and correspond to array X, have an index i ranging from '0' to '9'. When a self-interference averaging domain is resource units two ('2') and three ('3') among the '10' resource units, two resource units corresponding to array X' have an index j ranging from '0' to '1'. Then, X'[0] and X'[1] become X[2] and X[3], respectively.

Similarly, the relation between array Y after permutation and Y', to which self-interference averaging is applied, is defined by Equation 5 below.

$$Y'[j]=Y[i] \quad [\text{Eqn. 5}]$$

where i represents a resource unit index with respect to the entire band. X[i] represents an array which is generated through permutation in response to X[i]. When being expressed by using a relevant resource unit index j in the self-interference averaging domain, Y[i] becomes Y'[j].

In an embodiment, when the number of a tone, a tile, and/or a cluster, which correspond to a self-interference averaging domain, is denoted as n', and an array, to which a new permutation is applied, is denoted as Z', a permutation equation defined by Equation 6 below may be used for self-interference averaging.

$$Z_{(L)}=P(n',\text{seed}(\text{ID\_cell})+O\_\text{offset}(L),Y') \quad [\text{Eqn. 6}]$$

Equation 6 represents a process in which permutation is additionally applied to an array Y', which is permutated with respect to the self-interference averaging domain, by re-using the existing permutation equation as expressed by Equation 3. Namely, the permutation is additionally performed for each of all layers or additional layers except the existing layer (i.e. the first layer) with respect to the self-interference averaging domain by applying unique offsets O_offset(L) according to the layers to the existing permutation equation. Thereby, independent permutation equations, each of which can pseudo-randomly mix resource units, can be constructed for all the layers in the self-interference averaging domain, respectively. It is desirable that the offsets according to the layers are differently set according to the layers in Equation 6.

In the situation as described above, L represents a layer index. Offset O_offset(L) for each layer may be designated and shared for each layer between a BS and each MS when the system is initially configured. Alternatively, the BS may periodically or aperiodically notify offset O_offset(L) for each layer to each MS. For example, offset O_offset(L) for each layer may be implemented by differently setting a Permutation Base (PermBase) value, which is used in the IEEE 802.16e standard, for each layer.

Another example of a permutation equation for self-interference averaging is defined by Equation 7 below.

$$Z_{(L)}=P'_{(L)}(n',\text{seed}(\text{ID\_cell}),Y') \quad [\text{Eqn. 7}]$$

Equation 7 represents a scheme in which an independent permutation is additionally performed for all the layers or additional layers with respect to the self-interference averaging domain separately from the existing permutation equation. In this situation, $P'_{(L)}$ represents a unique permutation equation for each layer with respect to a layer L. Namely, it is desirable that permutation equations according to the layers are differently determined according to the layers.

$Z_{(L)}[j]$, which is the $i^{th}$ resource unit of $Z_{(L)}$ generated by Equation 6 or Equation 7, is a result permutated in response to X'[j] as expressed by Equation 4, and corresponds to X[i]. Finally, an array $Y_{(L)}$ of the entire band with respect to layer L, to which self-interference averaging is applied, is defined by Equation 8 below.

$$Y_{(L)}[X'[j]]=Z_{(L)}[j] \text{ or}$$

$$Y_{(L)}[X[i]]=Z_{(L)}[j] \quad [\text{Eqn. 8}]$$

In short, $Y_{(L)}[X[i]]$ permutated at layer L in response to a resource unit X[i] in the entire band, which belongs to the self-interference averaging domain, and is finally replaced by $Z_{(L)}[j]$, which is a result of additionally performing permutation on arrays X' and Y', according to Equation 6 or Equation 7, when Y[i] permutated in response to X[i] is transformed to arrays X' and Y' with respect to the self-interference averaging domain as defined by Equations 4 and 5.

The permutation scheme determined in the method as described above is previously shared between a BS and each MS. The BS allocates each MS to an uplink channel in a predetermined scheduling method with respect to the self-interference averaging domain. Then it delivers the relevant channel allocation and layer allocation information to each MS.

When receiving an uplink signal from each MS according to the channel allocation and layer allocation information, the BS performs demultiplexing and decoding according to the layers on a received signal in the self-interference averaging domain by using permutation schemes according to the layers which have been predetermined according to the layers. At this time, the existing demultiplexer may be used for a signal domain other than the self-interference averaging domain or the first layer in the self-interference averaging domain. A modified demultiplexer including re-permutation is used for a domain excluding the first layer from the self-interference averaging domain. In this manner, the BS can receive multi-user CSM data with a self-interference averaging effect.

Figure 6:
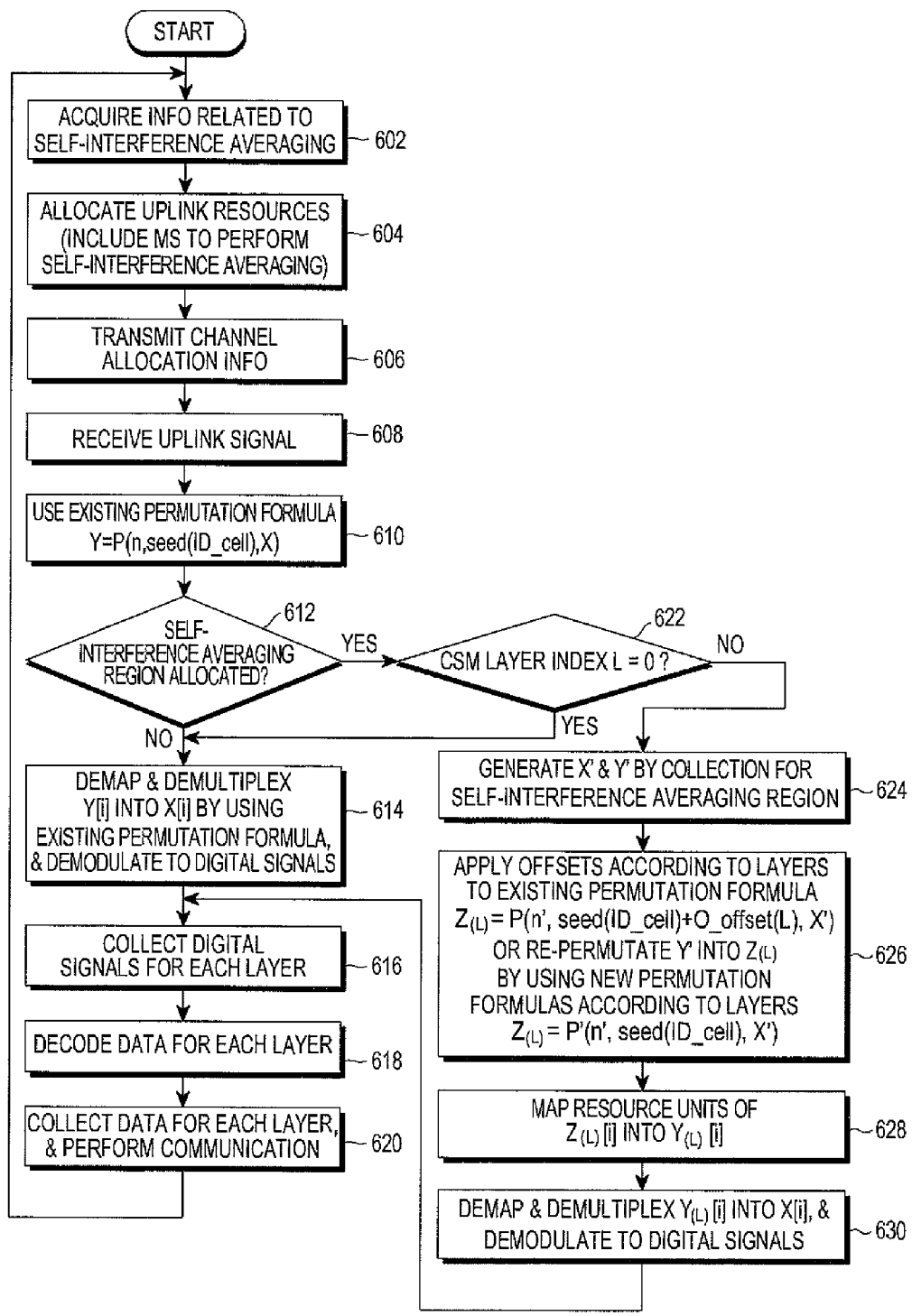
FIG. 6 illustrates a process for self-interference averaging of the BS in the wireless communication system according to an embodiment of the present invention.

FIG. 6 illustrates a process for self-interference averaging of the BS in the wireless communication system according to an embodiment of the present invention. FIG. 6 illustrates the operation in which the BS uses the existing permutation equation for the existing layer (i.e. the first layer) as is. Also, it illustrates the operation in which the BS re-permutates and demultiplexes resource units in a self-interference averaging domain that have been permutated by the existing permutation equation only for an additional layer. In this situation, the re-permutation is performed by applying offsets according to the layers to a seed value with respect to all the layers including the existing layer or by using permutation equations according to the layers.

Referring to FIG. 6, in block 602, the BS acquires related information between the BS and each MS for performing self-interference averaging. The related information may include allocation information directing the self-interference averaging domain and permutation information indicating a permutation scheme for each layer in the self-interference averaging domain. The permutation information, for example, represents an offset for each layer or a permutation equation for each layer for each of all the layers or additional layers. Also, the related information may be previously shared between the BS and each MS, and may be read from an internal memory device. Alternatively, the related information may be determined by the operation of the BS, and may be periodically or aperiodically communicated to each MS.

In block 604, the BS performs scheduling for all connected MSs through an uplink transmission scheduler, and performs uplink resource allocation. All of the connected MSs include target MSs which are to perform self-interference averaging. In block 606, channel allocation information according to the result of the scheduling is transmitted to each scheduled MS. When receiving the channel allocation information, each scheduled MS transmits an uplink signal, which includes data or control information, through time and frequency resources of an allocated frame or sub-frame.

In block 608, the BS receives an uplink signal transmitted from at least one of the scheduled MSs through resource units of a band allocated according to the channel allocation information. In block 610, the BS determines a corresponding relation between arrays, which become an input and output of an existing permutation equation, by using the existing permutation equation. Alternatively, the BS reads the previously-stored corresponding relation from an internal memory device.

In block 612, the BS checks whether the self-interference averaging domain is allocated based on the related information acquired in block 602. When the self-interference averaging domain is not allocated or when an uplink signal in a domain, which does not correspond to the self-interference averaging domain, is intended to be decoded, the BS proceeds to block 614 in order to perform a permutation operation according to the existing scheme. In contrast, when the self-interference averaging domain is allocated and an uplink signal in the self-interference averaging domain is intended to be decoded, the BS proceeds to block 622 in order to perform a permutation operation according to an embodiment of the present invention. In an embodiment, when the entire system band is used as the self-interference averaging domain or when the use of the self-interference averaging domain is predetermined, block 612 may be omitted, and the BS may proceed to block 622 immediately after block 610.

In block 614, the BS, for example, permutates resource units allocated to each scheduled MS by using the existing permutation equation, which is predetermined according to Equation 3. Specifically, when X represents a resource unit index array before being permutated and Y represents a resource unit index array after being permutated, the BS inversely permutates resource units of array Y, which has been permutated and then has been received, and demaps and demultiplexes the resource units of array Y into the resource units of array X, based on a corresponding relation between array X and array Y. Then, the BS demodulates received signals of the resource units, which are demapped and demultiplexed, to digital signals, respectively. In block 616, the BS collects the digital signals for each layer, and proceeds to block 618. In block 618, the BS decodes the collected digital signals for each layer. In block 620, the BS collects the data, which is decoded for each layer, and delivers the collected data to an upper layer, thereby performing communication.

In block 622, the BS checks whether a CSM layer index L, which is intended to be currently received and decoded, is equal to '0'. When CSM layer index L is equal to '0', the BS proceeds to block 614 in order to use the existing permutation equation for the existing layer (i.e. the first layer). In contrast, when CSM layer index L is not equal to '0', the BS proceeds to block 624. In block 624, the BS collects resource units belonging to the self-interference averaging domain. In block 626, the BS performs an additional re-permutation on the collected resource units. A permutation equation for the re-permutation, for example, is generated by applying offset O_Offset(L) for each layer to the existing permutation equation, according to Equation 6. Alternatively, the permutation equation for the re-permutation is determined as an additional permutation equation which is independent for each layer according to Equation 7. The determination of the permutation equation may be predetermined or may be made based on the related information collected in block 602.

In block 628, the BS allocates resource units, which have been re-permutated in block 626, as resource units which are finally permutated with respect to the entire band. In block 630, the BS demaps a received signal of finally-permutated $Y_{(L)}[i]$ into $X[i]$ and demultiplexes the received signal into a data channel, and then demodulates the data channel to a digital signal. Then, the BS proceeds to block 616.

Figure 7:
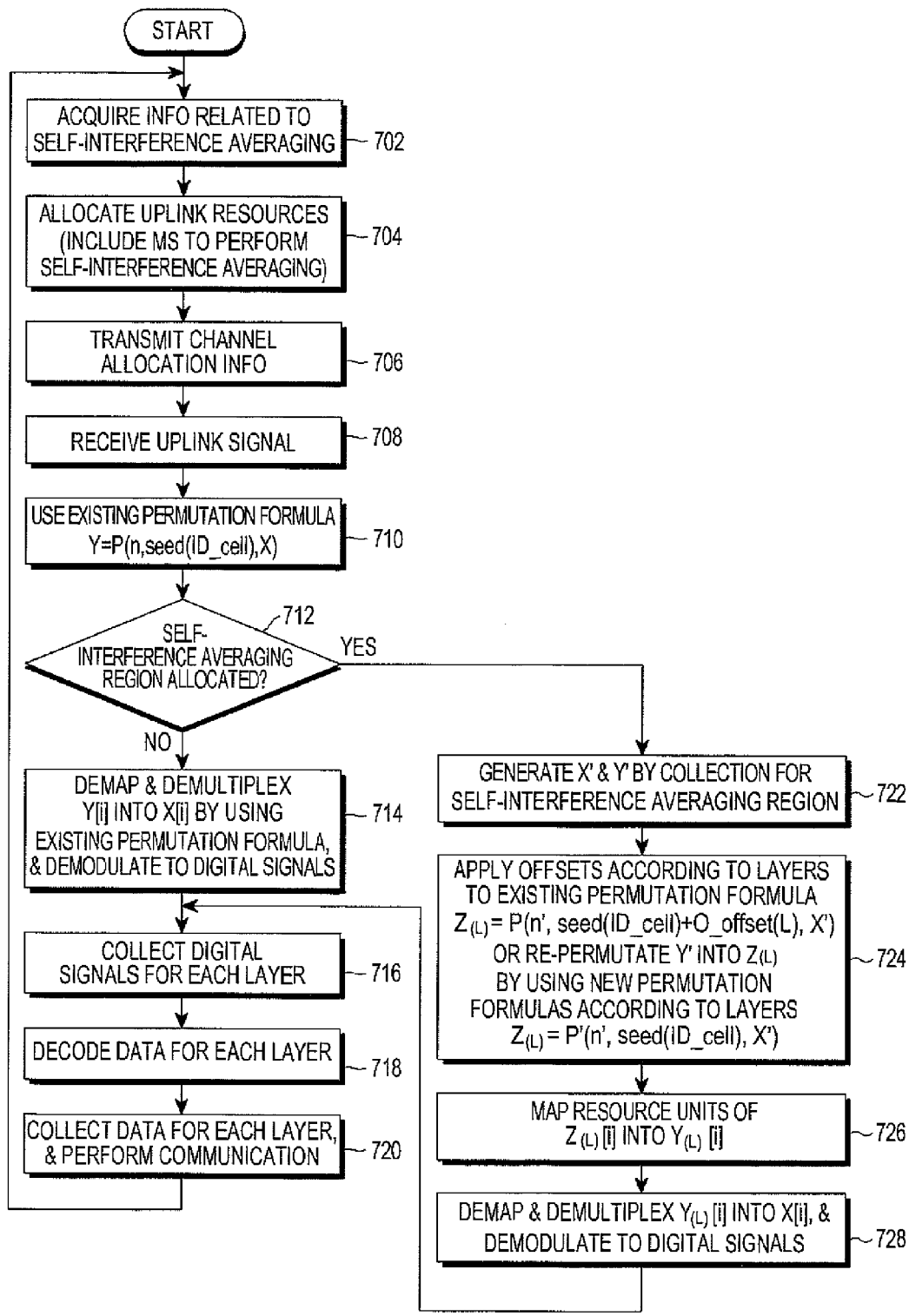
FIG. 7 illustrates a process for self-interference averaging of a BS in a wireless communication system according to an embodiment of the present invention.

FIG. 7 illustrates a process for self-interference averaging of a BS in a wireless communication system according to an embodiment of the present invention. FIG. 7 illustrates the operation in which the BS re-permutates resource units in a self-interference averaging domain, which have been permutated by the existing permutation equation, and applies demultiplexing to resource units, such as all tones, tiles, and/or clusters, for which self-interference averaging is used. In this embodiment, the re-permutation is performed by applying an offset to a seed value with respect to all layers including the existing layer (i.e. the first layer) or by using a permutation equation for each layer.

Referring to FIG. 7, in block 702, the BS acquires related information between the BS and each MS for performing self-interference averaging. The related information may include allocation information directing a self-interference averaging domain and permutation information indicating a permutation scheme for each layer in the self-interference averaging domain. The permutation information, for example, represents an offset for each layer or a permutation equation for each layer for each of all the layers or additional layers. Also, the related information may be previously shared between the BS and each MS, and may be read from an internal memory device. Alternatively, the related information may be determined by the operation of the BS, and may be periodically or aperiodically communicated to each MS.

In block 704, the BS performs scheduling for all connected MSs through an uplink transmission scheduler and performs uplink resource allocation. All of the connected MSs include target MSs which are to perform self-interference averaging. In block 706, channel allocation information according to the result of the scheduling is transmitted to each scheduled MS. In block 708, the BS receives an uplink signal transmitted from at least one of the scheduled MSs through resource units of a band allocated according to the channel allocation information. In block 710, the BS determines a corresponding relation between arrays, which become an input and output of the existing permutation equation, by using the existing permutation equation. Alternatively, the BS reads the previously-stored corresponding relation from an internal memory device.

In block 712, the BS checks whether the self-interference averaging domain is allocated based on the related information acquired in block 702. When the self-interference averaging domain is not allocated or when an uplink signal in a domain, which does not correspond to the self-interference averaging domain, is intended to be decoded, the BS proceeds to block 714 in order to perform a permutation operation according to the existing scheme. In contrast, when the self-interference averaging domain is allocated and an uplink signal in the self-interference averaging domain is intended to be decoded, the BS proceeds to block 722 in order to perform a permutation operation according to an embodiment of the present invention. In another embodiment, when the entire system band is used as the self-interference averaging domain or when the use of the self-interference averaging domain is predetermined, block 712 may be omitted, and the BS may proceed to block 722 immediately after block 710.

In block 714, the BS, for example, permutates resource units allocated to each scheduled MS by using the existing permutation equation, which is predetermined according to Equation 3. Specifically, when X represents a resource unit index array before being permutated and Y represents a resource unit index array after being permutated, the BS inversely permutates resource units of array Y, which has been permutated and then has been received, and demaps and demultiplexes the resource units of array Y into the resource units of array X, based on a corresponding relation between array X and array Y. Then, the BS demodulates received signals of the resource units, which are demapped and demultiplexed, to digital signals, respectively. In block 716, the BS collects the digital signals for each layer, and proceeds to block 718. In block 718, the BS decodes the collected digital signals for each layer. In block 720, the BS collects the data, which is decoded for each layer, and delivers the collected data to an upper layer, thereby performing communication.

Meanwhile, in block 722, the BS collects resource units belonging to the self-interference averaging domain with respect to all the layers regardless of a CSM layer index that is intended to be decoded. In block 724, the BS performs an additional re-permutation on the collected resource units. A permutation equation for the re-permutation, for example, is generated by applying offset O_Offset(L) for each layer to the existing permutation equation, according to Equation 6. Alternatively, the permutation equation for the re-permutation is determined as an additional permutation equation which is independent for each layer according to Equation 7. The determination of the permutation equation is made based on related information collected in block 702.

In block 726, the BS allocates resource units, which have been re-permutated in block 724, as resource units which are finally permutated with respect to the entire band. In block 728, the BS demaps a signal of finally-permutated $Y_{(L)}[i]$ into $X[i]$, demultiplexer the signal into a data channel, and then demodulates the data channel to a digital signal. Then, the BS proceeds to block 716.

Figure 8A:
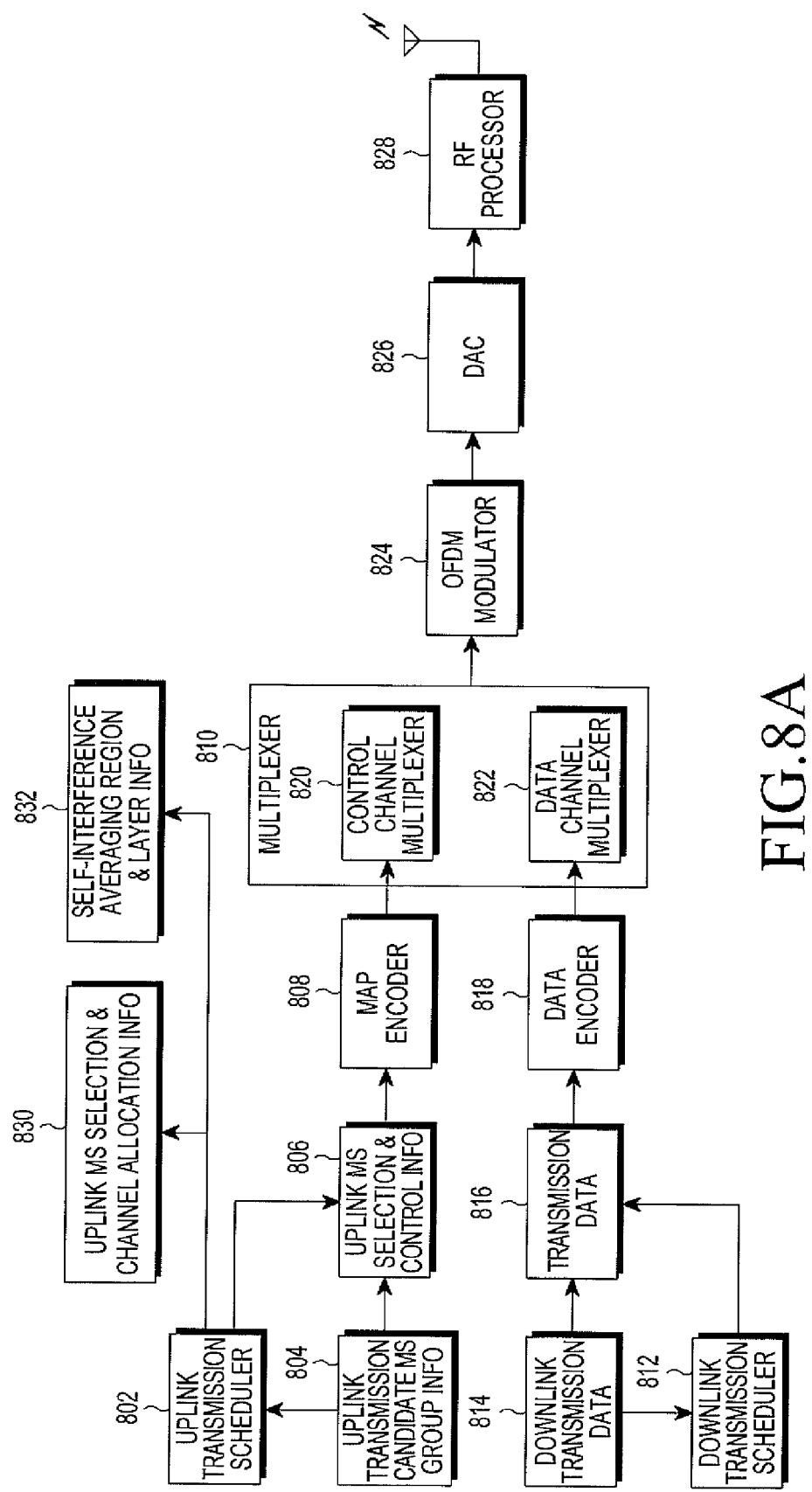
FIGS. 8A and 8B are block diagrams illustrating transmission and reception configurations for self-interference averaging of the BS in the wireless communication system according to an embodiment of the present invention.
Figure 8B:
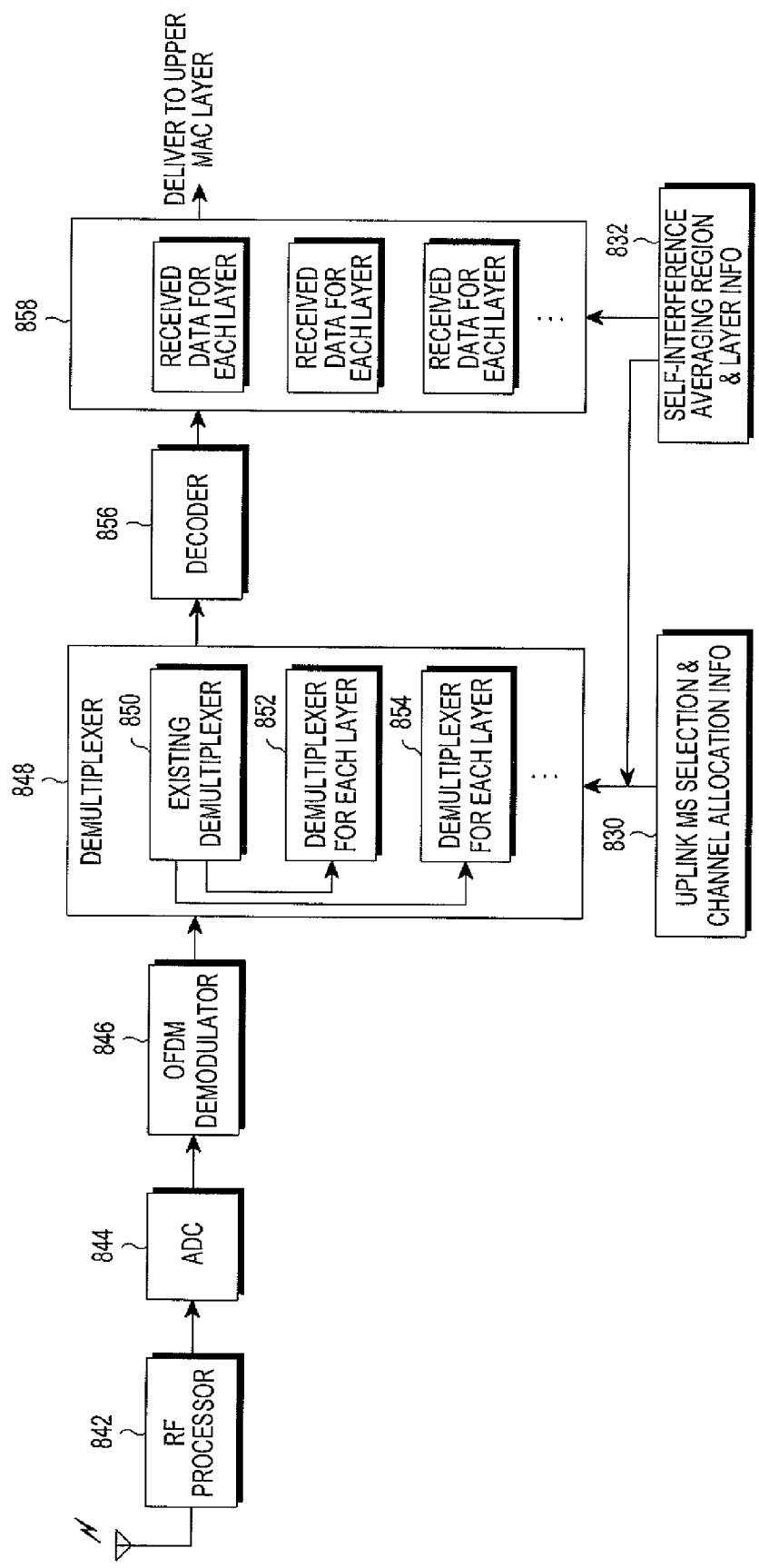

FIGS. 8A and 8B are block diagrams illustrating transmission and reception configurations for self-interference averaging of the BS in the wireless communication system according to an embodiment of the present invention. When a BS provides, to a relevant MS, allocation information directing a self-interference averaging domain and permutation information indicating a permutation scheme for each layer in the self-interference averaging domain, as related information necessary for self-interference averaging, the BS may further include a control information transmitter for generating and transmitting the related information. In FIGS. 8A and 8B, the control information transmitter is not shown.

Referring to FIG. 8A, an uplink transmission scheduler 802 schedules transmission candidate MSs with reference to information 804 on the transmission candidate MSs of an uplink, and selects MSs which are to perform uplink transmission. The uplink transmission scheduler 802 generates selection and control information 806 indicating the selected MSs, a layer allocated the selected MSs, and/or a permutation scheme, and such, and provides the generated selection and control information 806 to a MAP encoder 808. At this time, uplink MS selection and channel allocation information 830 and allocation layer information 832 related to the self-interference averaging domain, which are generated based on the result of the scheduling, are provided to a reception path. MAP encoder 808 generates a MAP message by using other pieces of information, which are necessary for generating the MAP message, along with selection and control information 806. Then, MAP decoder 808 provides the generated MAP message to control channel multiplexer 820 of a multiplexer 810.

When there is downlink transmission data 814 to be transmitted from the BS to at least one MS, transmission data 816, which is selected by scheduling of a downlink transmission scheduler 812 among multiple pieces of downlink transmission data 814, is input to a data encoder 818. Data encoder 818 encodes transmission data 816 in a predetermined encoding scheme and provides the encoded transmission data to data channel multiplexer 822 of multiplexer 810.

Control channel multiplexer 820 and data channel multiplexer 822 of multiplexer 810 multiplex input data, and map appropriate resources into the relevant channel and the relevant user/layer. At this time, when the need arises, data input by a particular user is mapped into a channel to which permutation is applied.

Output data from multiplexer 810 is OFDM-modulated by an Orthogonal Frequency Division Multiplexing (OFDM) modulator 824. Then, the OFDM-modulated data is converted to an analog data signal by a Digital to Analog Converter (DAC) 826. The analog data signal is converted to a Radio Frequency (RF) data signal, and is mixed and carried with/by an RF carrier while going through an RF processor 828. Then, RF processor 828 transmits the RF data signal carried by the RF carrier to each MS through an antenna.

Referring to FIG. 8B, an analog RF signal, which is transmitted from each MS and is received by the BS, is converted to an analog baseband signal by an RF processor 842. The analog baseband signal is converted to a digital signal by an Analog to Digital Converter (ADC) 844. Then, the digital signal goes through an OFDM demodulator 846, and is input to a demultiplexer 848.

Demultiplexer 848 includes multiple demultiplexers 850, 852, and 854, each of which can perform a special-purpose permutation. In this situation, demultiplexer 850 performs a permutation operation for a domain (i.e. the existing permutation scheme) other than the self-interference averaging domain. Demultiplexers 852 and 854, for each layer, are configured to perform a permutation operation for the self-interference averaging domain in a permutation scheme corresponding to the relevant layer. Each of demultiplexers 852 and 854, for each layer, demultiplexes data, which corresponds to the self-interference averaging domain among output data from OFDM demodulator 846, according to a permutated channel structure of the relevant layer with reference to uplink MS selection and channel allocation information 830 determined by uplink transmission scheduler 802. At this time, the data corresponding to the self-interference averaging domain can be recognized based on allocation layer information 832 delivered from a transmission path. The demultiplexed data is recovered as received data for each layer by a decoder 856. The received data 858 for each layer is delivered to an upper Media Access Control (MAC) layer.

As described above, the BS can use special-purpose demultiplexers 852 and 854 for each layer with respect to the self-interference averaging domain and can independently receive data for each layer. Demultiplexers 850, 852, and 854 may exist in an independent form in terms of hardware. Alternatively, demultiplexers 850, 852, and 854 may be configured as a single integrated hardware and may be implemented simply by changing an arithmetic operation value according to an internal branching algorithm.

Hereinafter, the operation and configuration of an MS according to an embodiment of the present invention will be described in detail.

An MS receives allocation information and/or permutation information on additional layers, which direct a self-interference averaging domain in relation to self-interference averaging, and such, through a control signal from a BS. Then, the MS determines, based on the received information, whether it performs permutation for a layer allocated to it. A permutation scheme for the layer is acquired from information that has been previously agreed upon between the BS and the MS, or received.

Figure 9:
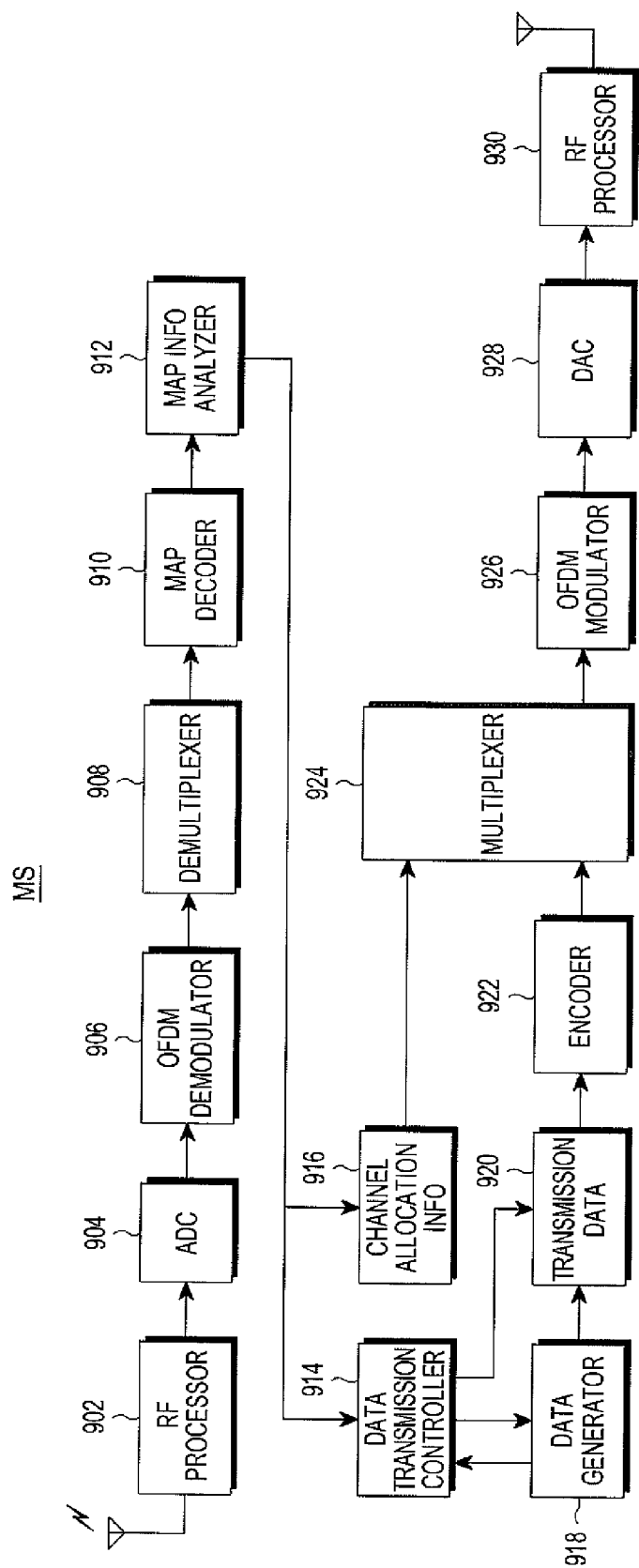
FIG. 9 is a block diagram illustrating transmission and reception configurations of an MS in the wireless communication system according to an embodiment of the present invention.

FIG. 9 is a block diagram illustrating transmission and reception configurations of the MS in the wireless communication system according to an embodiment of the present invention. When the BS provides, to the MS, the allocation information directing the self-interference averaging domain and permutation information indicating a permutation scheme for each layer in the self-interference averaging domain, as related information necessary for self-interference averaging, the MS may further include a control information receiver for receiving the related information. In FIG. 9, the control information receiver is not shown.

Referring to FIG. 9, an RF processor 902 receives a downlink signal from the BS through an antenna. An ADC 904 converts the received signal to a digital signal. An OFDM demodulator 906 demodulates the digital signal to OFDM data. A demultiplexer 908 performs an inverse operation, which corresponds to multiplexing performed by the BS, on output data from OFDM demodulator 906. Thereby, demultiplexer 908 acquires control channel data mapped to a control channel resource domain. A MAP decoder 910 decodes the control channel data and acquires information elements included in a MAP message. A MAP information analyzer 912 analyzes the information elements included in the MAP message, and acquires uplink MS selection information and channel allocation information, which are provided by the BS. Then, MAP information analyzer 912 provides the MS selection information to a data transmission controller 914 and provides channel allocation information 916 to a multiplexer 924.

When the MS selection information indicates that the MS is scheduled by the BS, data transmission controller 914 controls a data generator 918 to output transmission data 920. Transmission data 920 is encoded by an encoder 922. Then, encoder 922 provides the encoded transmission data to multiplexer 924. When multiplexing the encoded transmission data from encoder 922 based on channel allocation information 916, multiplexer 924 applies permutation for the relevant layer to multiplexing. Specifically, multiplexer 924 performs an inverse operation corresponding to demultiplexing performed by the BS. Output data from multiplexer 924 is OFDM-modulated by an OFDM modulator 926. Then, the OFDM-modulated data is converted to an analog data signal by a DAC 928. The analog data signal is converted to an RF data signal and is mixed and carried with/by an RF carrier while going through an RF processor 930. Then, RF processor 930 transmits the RF data signal carried by the RF carrier to the BS through an antenna.

A component for performing permutation in the configuration of the MS as illustrated in FIG. 9 is multiplexer 924. Multiplexer 924 performs permutation according to a previously-agreed permutation scheme on resource units for data to be transmitted based on related information necessary for self-interference averaging, which is shared between the BS and the MS, and control information of various kinds received from the BS.

The MS receives allocation information, which directs a self-interference averaging domain in relation to self-interference averaging, and permutation information, which indicates a permutation scheme for each layer in the self-interference averaging domain, and such, through a control channel from the BS or from data which has been previously stored in a memory device. Also, when receiving a MAP message which indicates resource allocation at each frame, the MS checks whether it is scheduled by the BS. When the MS is scheduled by the BS, the MS further checks whether it is allocated to an additional layer in the self-interference averaging domain. When the MS is scheduled by the BS and is allocated to the additional layer in the self-interference averaging domain, the MS additionally applies a permutation equation for the additional layer, which is allocated to the MS, to the existing permutation equation based on the permutation information. Thereby, the MS performs re-permutation. At this time, Equation 6 or Equation 7 as defined above may be used as a permutation equation for the re-permutation.

Figure 10:
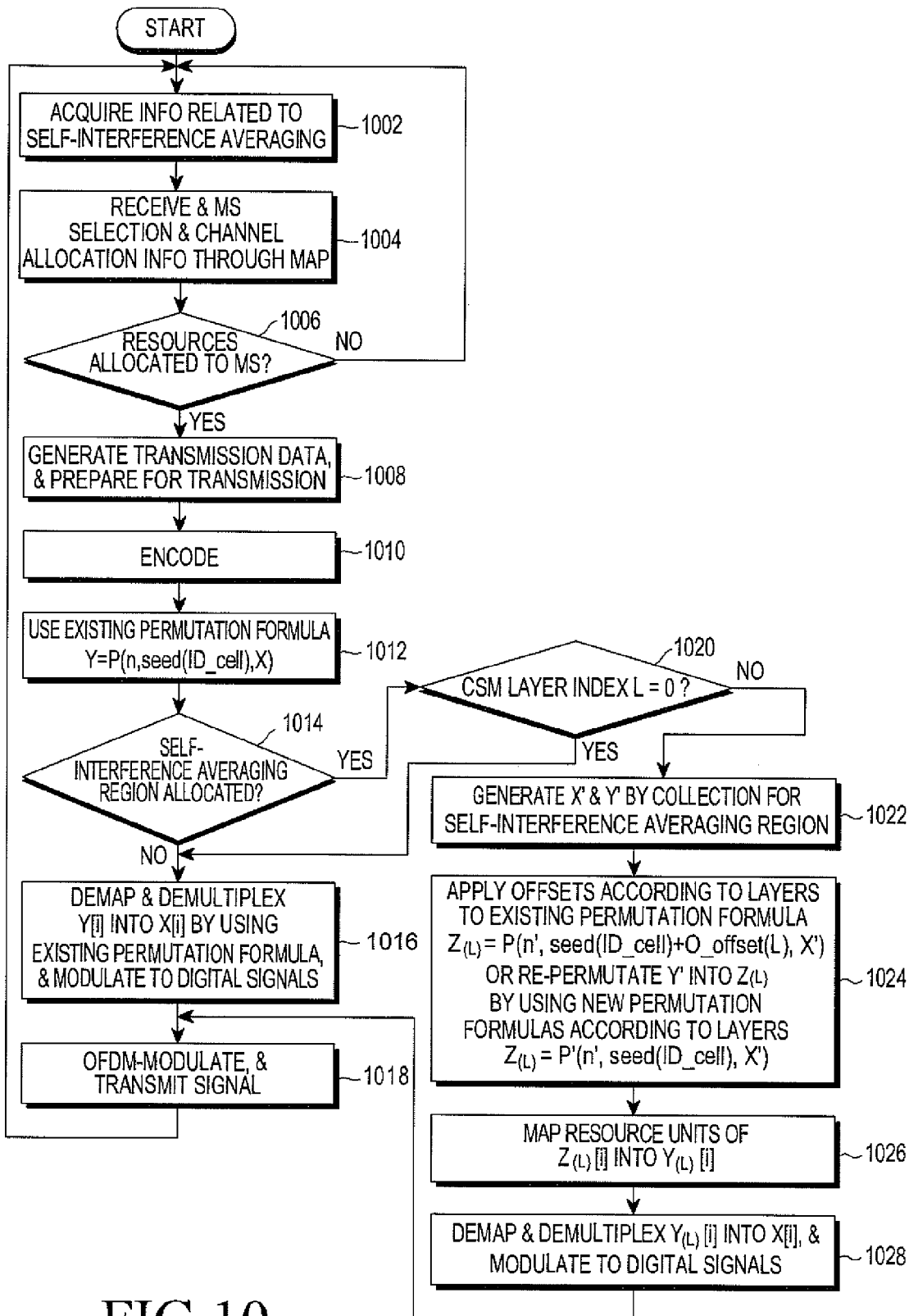
FIG. 10 illustrates a process for self-interference averaging of the MS in the wireless communication system according to an embodiment of the present invention.

FIG. 10 illustrates a process for self-interference averaging of the MS in the wireless communication system according to an embodiment of the present invention. FIG. 10 illustrates the operation in which the BS uses the existing permutation equation for the existing layer (i.e. the first layer) as is, in response to the operation of the BS of FIG. 6. Also, illustrates the operation when, only for an additional layer, the BS re-permutates resource units, which have been permutated by the existing permutation equation, by using the existing permutation equation or by using a special-purpose permutation equation for each layer, in response to the operation of the BS of FIG. 6.

Referring to FIG. 10, in block 1002, the MS acquires related information between the BS and the MS for performing self-interference averaging. The related information can include allocation information directing the self-interference averaging domain and permutation information indicating a permutation scheme for each layer in the self-interference averaging domain. The permutation information, for example, represents an offset for each layer or a permutation equation for each layer for each of all the layers or additional layers. Also, the related information may be previously shared between the BS and each MS and may be read from an internal memory device. Alternatively, the related information may be determined by the operation of the BS, and may be notified to each MS.

In block 1004, the MS receives from the BS a MAP message, which includes MS selection and channel allocation information according to uplink transmission scheduling of the BS, and analyzes the received MAP message. In block 1006, the MS checks whether the MS selection and channel allocation information indicates that the MS is allocated resources, i.e., whether the MS selection and channel allocation information indicates that the MS is scheduled. When the MS is scheduled, the MS proceeds to block 1008. When the MS is not scheduled, the MS returns to block 1002.

In block 1008, the MS generates transmission data based on the allocated resources and performs preparation for transmission, such as configuring the generated transmission data in a relevant transmission format. In block 1010, the MS encodes the transmission data.

In block 1012, the MS determines a corresponding relation between arrays, which become an input and output of an existing permutation equation based on the existing permutation equation. Alternatively, the MS reads the previously-stored corresponding relation from a memory device. In block 1014, the MS checks based on the related information acquired in block 1002 and the channel allocation information whether it is allocated to the self-interference averaging domain. When the MS is not allocated to the self-interference averaging domain, it proceeds to block 1016 in order to perform a permutation operation according to the existing scheme. When the MS is allocated to the self-interference averaging domain, it proceeds to block 1020 in order to perform a permutation operation according to an embodiment of the present invention. In another embodiment, when the entire system band is used as the self-interference averaging domain or when the use of the self-interference averaging domain is predetermined, block 1014 may be omitted, and the MS may proceed to block 1020 immediately after block 1012.

In block 1016, the MS, for example, permutates resource units allocated by the BS by using a predetermined permutation equation as defined by Equation 3, and modulates signals of the permutated resource units to digital signals. In block 1018, the MS maps the modulated data into the permutated resource units, and OFDM-modulates the mapped data to OFDM-modulated data. Then, the MS transmits an RF data signal carried by an RF carrier to the BS.

In block 1020, the MS checks whether an allocated CSM layer index L is equal to '0'. When CSM layer index L is equal to '0', the MS proceeds to block 1016 in order to use the existing permutation equation for the existing layer (i.e. the first layer). In contrast, when CSM layer index L is not equal to '0', the MS proceeds to block 1022. In block 1022, the MS collects resource units in the self-interference averaging domain with respect to an allocated layer, and proceeds to block 1024. In block 1024, the MS applies a changed permutation equation to resource units of the allocated layer and re-permutates the resource units allocated to the MS, and proceeds to block 1026. A permutation equation for the re-permutation, for example, is generated by applying offset O_Offset(L) for each layer to the existing permutation equation, according to Equation 6. Alternatively, the permutation equation for the re-permutation is determined as a special-purpose permutation equation for each layer according to Equation 7. The determination of the permutation equation may be predetermined or may be made based on the related information collected in block 1002.

In block 1026, the MS allocates resource units, which have been re-permutated in block 1024, as resource units which are finally permutated with respect to the entire band. In block 1028, the MS demaps a signal of finally-permutated $Y_{(L)}[i]$ into $X[i]$, multiplexes the signal into a data channel, and then modulates the data channel to a digital signal. Then, the MS proceeds to block 1018.

Figure 11:
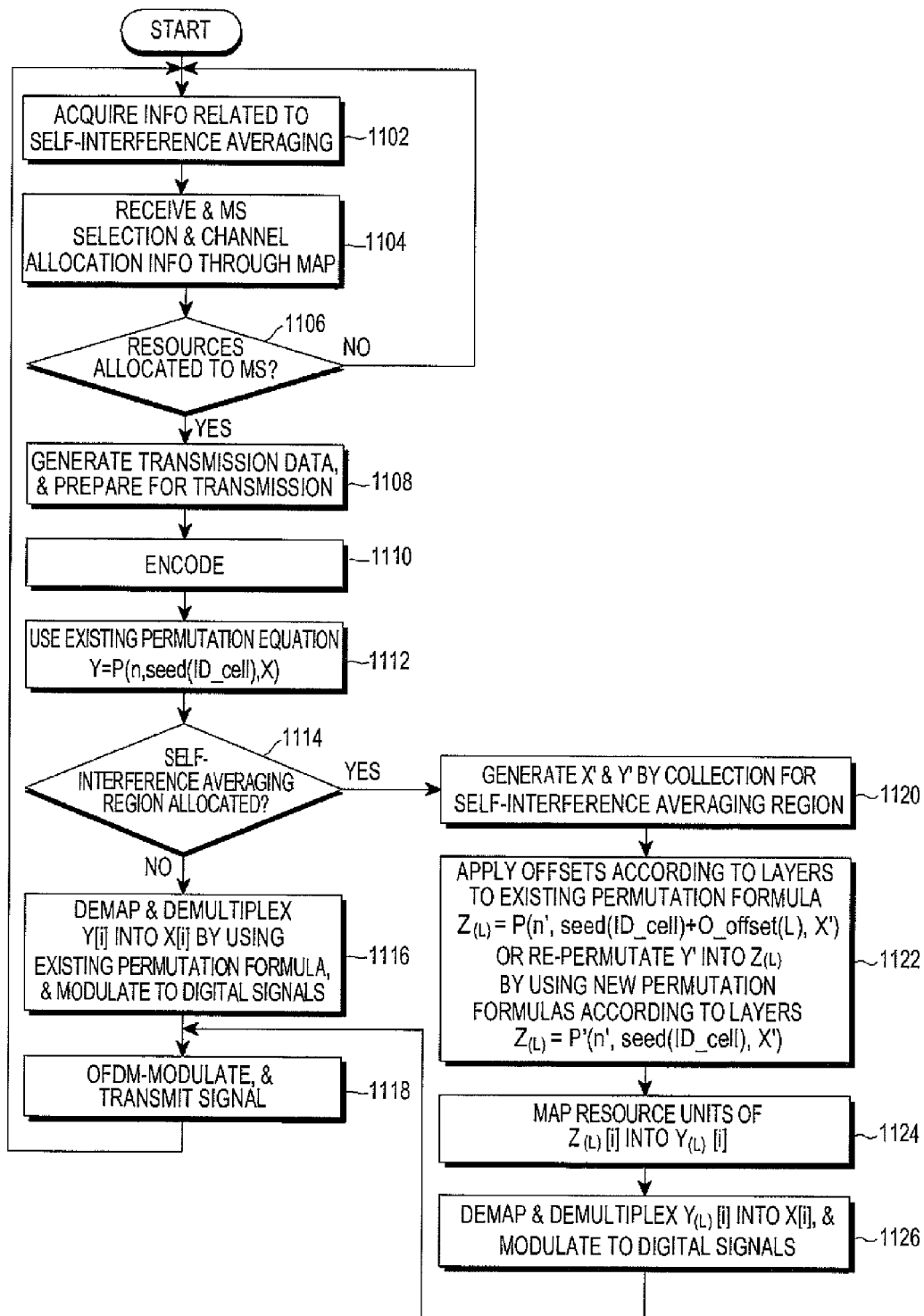
FIG. 11 illustrates a process for self-interference averaging of an MS in the wireless communication system according to an embodiment of the present invention.

FIG. 11 illustrates a process for self-interference averaging of an MS in the wireless communication system according to an embodiment of the present invention. FIG. 11 illustrates the operation in which, for all layers including the existing layer (i.e. the first layer), the MS re-permutates resource units, which have been permutated by the existing permutation equation, by using the existing permutation equation or by using a special-purpose permutation equation for each layer, in response to the operation of the BS of FIG. 7.

Referring to FIG. 11, in block 1102, the MS acquires related information between the BS and the MS for performing self-interference averaging. The related information can include allocation information directing a self-interference averaging domain and permutation information indicating a permutation scheme for each layer in the self-interference averaging domain. The permutation information, for example, represents an offset for each layer or a permutation equation for each layer for each of all the layers or additional layers. Also, the related information may be previously shared between the BS and each MS and may be read from an internal memory device. Alternatively, the related information may be determined by the operation of the BS, and may be periodically or aperiodically communicated to each MS.

In block 1104, the MS receives from the BS a MAP message, which includes MS selection and channel allocation information according to uplink transmission scheduling of the BS, and analyzes the received MAP message. In block 1106, the MS checks whether the MS selection and channel allocation information indicates that the MS is allocated resources, i.e., whether the MS selection and channel allocation information indicates that the MS is scheduled. When the MS is scheduled, it proceeds to block 1108. When the MS is not scheduled, it returns to block 1102.

In block 1108, the MS generates transmission data based on the allocated resources, and performs preparation for transmission, such as configuring the generated transmission data in a relevant transmission format. In block 1110, the MS encodes the transmission data.

In block 1112, the MS determines a corresponding relation between arrays, which become an input and output of an existing permutation equation based on the existing permutation equation. Alternatively, the MS reads the previously-stored corresponding relation from an internal memory device. In block 1114, the MS checks based on the related information acquired in block 1102 and the channel allocation information whether it is allocated to the self-interference averaging domain. When the MS is not allocated to the self-interference averaging domain, it proceeds to block 1116 in order to perform a permutation operation according to the existing scheme. When the MS is allocated to the self-interference averaging domain, it proceeds to block 1120 in order to perform a permutation operation according to an embodiment of the present invention. In another embodiment, when the entire system band is used as the self-interference averaging domain or when the use of the self-interference averaging domain is predetermined, block 1114 may be omitted, and the MS may proceed to block 1120 immediately after block 1112.

In block 1116, the MS, for example, permutates resource units allocated by the BS by using a predetermined existing permutation equation as defined by Equation 3. In block 1118, the MS maps the decoded data into the permutated resource units, and OFDM-modulates the mapped data to OFDM-modulated data. Then, the MS transmits an RF data signal carried by an RF carrier to the BS.

Meanwhile, in block 1120, the MS collects resource units in the self-interference averaging domain with respect to an allocated CSM layer regardless of whether the allocated CSM layer is the existing layer (i.e. the first layer), and proceeds to block 1122. In block 1122, the MS applies a changed permutation equation to resource units of the allocated layer, re-permutates the relevant resource units allocated to the MS, and proceeds to block 1124. A permutation equation for the re-permutation, as an example, is generated by applying offset O_Offset(L) for each layer to the existing permutation equation, according to Equation 6. Alternatively, the permutation equation for the re-permutation is determined as a permutation equation for each layer according to Equation 7. The determination of the permutation equation may be predetermined or may be made based on the related information collected in block 1102.

In block 1124, the MS allocates resource units, which have been re-permutated in block 1122, as resource units which are finally permutated with respect to the entire band. In block 1126, the MS demaps a signal of finally-permutated $Y_{(L)}[i]$ into $X[i]$, multiplexes the signal into a data channel, and then modulates the data channel to a digital signal. Then, the MS proceeds to block 1118.

Figure 12:
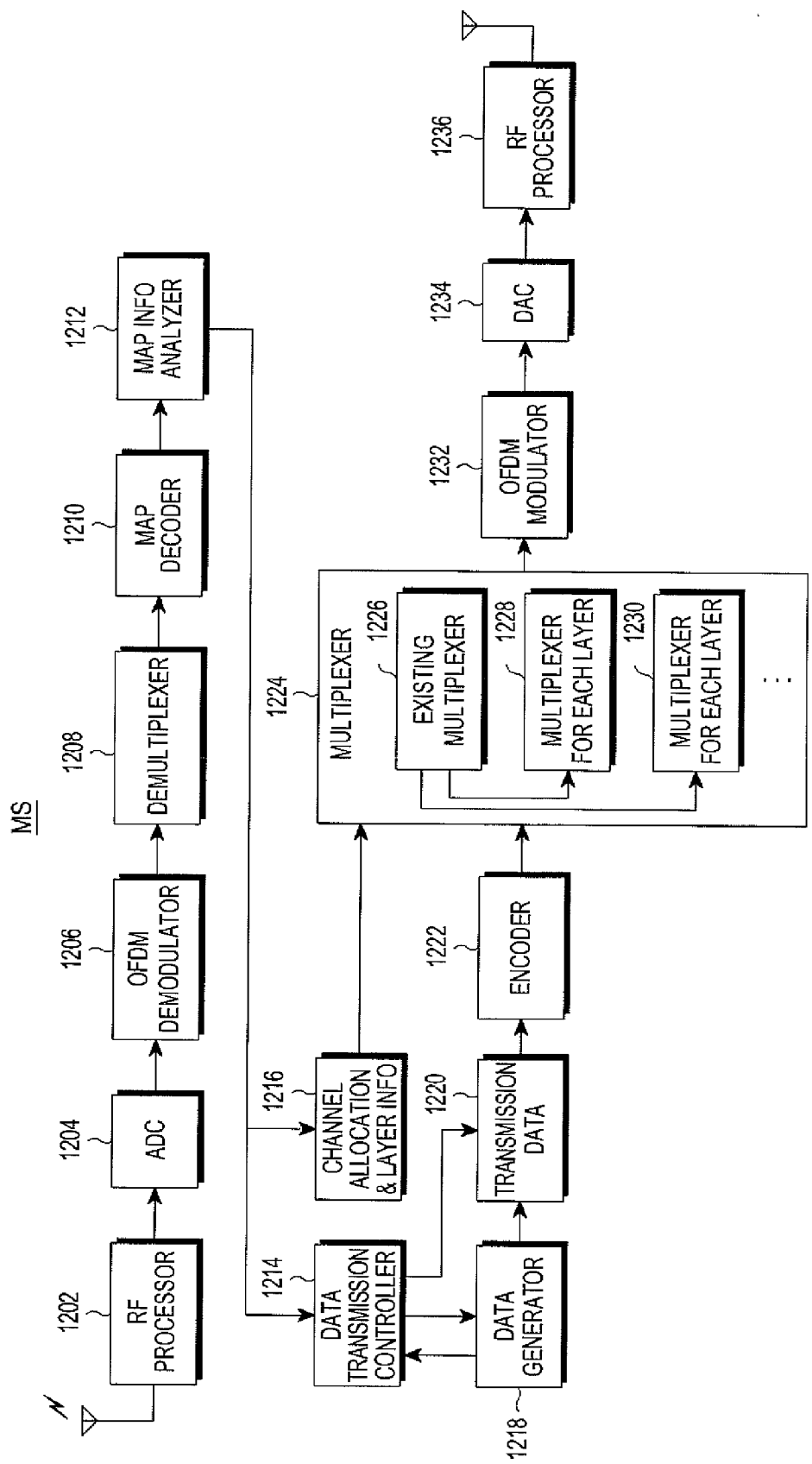
FIG. 12 is a block diagram illustrating transmission and reception configurations for self-interference averaging of an MS in the wireless communication system according to an embodiment of the present invention.

FIG. 12 is a block diagram illustrating transmission and reception configurations for self-interference averaging of an MS in the wireless communication system according to an embodiment of the present invention.

Referring to FIG. 12, an RF processor 1202 receives a downlink signal from the BS through an antenna. An ADC 1204 converts the received signal to a digital signal. An OFDM demodulator 1206 demodulates the digital signal to OFDM data. A demultiplexer 1208 performs an inverse operation, which corresponds to multiplexing performed by the BS, on output data from OFDM demodulator 1206. Thereby, demultiplexer 908 acquires control channel data mapped into a control channel.

A MAP decoder 1210 decodes the control channel data and acquires information included in a MAP message. A MAP information analyzer 1212 analyzes the information included in the MAP message and acquires uplink MS selection information and channel allocation and layer information, which are provided by the BS. Then, MAP information analyzer 1212 provides the MS selection information to a data transmission controller 1214 and provides channel allocation and layer information 1216 to a multiplexer 1224.

When the MS selection information indicates that the MS is scheduled by the BS, data transmission controller 1214 controls a data generator 1218 to output transmission data 1220. Transmission data 1220 is encoded by an encoder 1222. Then, encoder 1222 provides the encoded transmission data to multiplexer 1224.

Multiplexer 1224 includes multiple multiplexers 1226, 1228, and 1230, each of which can perform a special-purpose permutation. In this situation, multiplexer 1226 performs a permutation operation for a domain (i.e. the existing permutation scheme) other than the self-interference averaging domain. Multiplexers 1228 and 1230, for each layer, are configured to perform a permutation operation for the self-interference averaging domain in a permutation scheme corresponding to the relevant layer. When multiplexing the encoded data from encoder 1222 based on channel allocation and layer information 1216, each of multiplexers 1228 and 1230, for each layer, applies permutation according to the relevant layer to multiplexing. Output data from multiplexer 1224 is OFDM-modulated by an OFDM modulator 1226. Then, the OFDM-modulated data is converted to an analog data signal by a DAC 1228. The analog data signal is converted to an RF data signal and is mixed and carried with/by an RF carrier while going through an RF processor 1230. Then, RF processor 1230 transmits the RF data signal carried by the RF carrier to the BS through an antenna.

According to the present invention as described above, in an uplink of a wireless communication system, target MSs, which become pairs, are not designated, and the number of them is made plural. Thereby, an averaged self-interference is generated. When multi-user CSM is used, self-interferences or interferences between layers are averaged as described above, thereby reducing variable widths of parameters of various kinds and improving the prediction property of a received SINR. As a result, a Packet Error Ratio (PER) performance is improved when data is actually transmitted.

Also, additional channel information is not necessary for multi-user allocation, such that an additional overhead does not occur and the multi-user allocation can be simplified. Because user pair selection (i.e. user-pairing) and user allocation by a scheduler can be applied independently, the scheduler can optimize the user allocation in a simple manner. Namely, there are no limits on an existing scheme or configuration and apparatus for scheduling. As a result, it is possible to make the existing scheduler stick to an optimized user allocation scheme.

Moreover, there is an advantage in that the use of a complex algorithm and hardware is not necessary for user pair selection. Hence, it is possible to more stably utilize the multi-user CSM technology and increase a system capacity as a result.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating multi-user Collaborative Spatial Multiplexing (CSM) in a wireless communication system, the method comprising:
performing uplink transmission scheduling on multiple Mobile Stations (MSs) for allocating the multiple MSs to multiple layers spatially discriminated for the multi-user CSM, wherein a first layer is allocated to a first MS and a second layer is allocated to at least one second MS;
permutating resource units, which have been allocated to the multiple layers, by applying different permutation schemes according to the layers such that self-interference values between the first MS in the first layer and the at least one second MS in the second layer are averaged; and
receiving uplink data from the scheduled MSs through the permutated resource units,
wherein the permutating changes an array of indexes of the resource units according to a permutation scheme of each layer.

2. The method of claim 1, wherein permutating the resource units comprises applying a permutation equation that includes different offsets according to the layers as inputs to the multiple layers.

3. The method of claim 1, wherein permutating the resource units comprises applying different permutation equations according to the layers.

4. The method of claim 1, wherein permutating the resource units comprises:
applying a first permutation scheme, which is substantially the same as a permutation scheme used when the multi-user CSM is not applied, to the first layer among the multiple layers; and
applying at least one second permutation scheme, which is different from the first permutation scheme, to the second layer excluding the first layer among the multiple layers.

5. The method of claim 1, wherein permutating the resource units comprises applying different permutation schemes to layers allocated to resource units in a multi-user CSM domain designated for self-interference averaging in a system band.

6. The method of claim 5, further comprising:
transmitting allocation information indicating the multi-user CSM domain and permutation information indicating the different permutation schemes according to the layers to the multiple MSs.

7. The method of claim 1, further comprising:
transmitting channel allocation and layer allocation information indicating a resource domain and a layer, which are allocated to each of the multiple MSs, to the multiple MSs.

8. A Base Station (BS) apparatus for operating multi-user Collaborative Spatial Multiplexing (CSM) in a wireless communication system, the BS apparatus comprising:
an uplink transmission scheduler configured to perform uplink transmission scheduling on multiple Mobile Stations (MSs) for allocating the multiple MSs to multiple layers spatially discriminated for the multi-user CSM, wherein a first layer is allocated to a first MS and a second layer is allocated to at least one second MS;
a demultiplexer configured to permutate resource units, which have been allocated to the multiple layers, by applying different permutation schemes according to the layers such that self-interference values between the first MS in the first layer and the at least one second MS in the second layer are averaged, and receiving uplink data, which is mapped to the permutated resource units, from the scheduled MSs; and a decoder configured to decode the uplink data, wherein the demultiplexer is configured to permutate the resource units by changing an array of indexes of the resource units according to a permutation scheme of each layer.

9. The BS apparatus of claim 8, wherein the demultiplexer applies a permutation equation that includes different offsets according to the layers as inputs to the multiple layers.

10. The BS apparatus of claim 8, wherein the demultiplexer applies different permutation equations according to the layers.

11. The BS apparatus of claim 8, wherein the demultiplexer applies a first permutation scheme, which is substantially the same as a permutation scheme used when the multi-user CSM is not applied, to the first layer among the multiple layers, and applies at least one second permutation scheme, which is different from the first permutation scheme, to the second layer excluding the first layer among the multiple layers.

12. The BS apparatus of claim 8, wherein the demultiplexer applies different permutation schemes to layers allocated to resource units in a multi-user CSM domain designated for self-interference averaging in a system band.

13. The BS apparatus of claim 12, further comprising:
a control information transmitter for generating allocation information indicating the multi-user CSM domain and permutation information indicating the different permutation schemes according to the layers, and transmitting the generated allocation information and permutation information to the multiple MSs.

14. The BS apparatus of claim 8, further comprising:
an MAP transmitter configured to transmit channel allocation and layer allocation information indicating a resource domain and a layer, which are allocated to each of the multiple MSs, to the multiple MSs through a MAP message.

15. A method for operating multi-user Collaborative Spatial Multiplexing (CSM) in a Mobile Station (MS) of a wireless communication system, the method comprising:
receiving, from a Base Station (BS), channel allocation information according to uplink transmission scheduling from the BS, wherein the channel allocation information indicates that multiple MSs are allocated to multiple layers spatially discriminated for the multi-user CSM such that a first layer is allocated a first MS and a second layer is allocated to at least one second MS;
permutating resource units allocated to the MS based on the channel allocation information by applying a relevant permutation scheme to a layer allocated to the MS among the multiple layers such that self-interference values between the first MS in the first layer and the at least one second MS in the second layer are averaged; and
transmitting uplink data to the BS through the permutated resource units,
wherein resource units allocated to the multiple layers are permutated by using different permutation schemes according to the layers,
wherein the permutating changes an array of indexes of the resource units according to a permutation scheme of each layer.

16. The method of claim 15, wherein the multiple layers are configured in such a manner that a permutation equation that includes different offsets according to the layers as inputs is applied to the multiple layers.

17. The method of claim 15, wherein the multiple layers are configured in such a manner that different permutation equations are applied to the multiple layers according to the layers.

18. The method of claim 15, wherein the first layer among the multiple layers is configured in such a manner that a first permutation scheme, which is substantially the same as a permutation scheme used when the multi-user CSM is not applied, is applied to the first layer, and the second layer excluding the first layer among the multiple layers is configured in such a manner that at least one second permutation scheme, which is different from the first permutation scheme, is applied to the second layer.

19. The method of claim 15, wherein the layers, which are allocated to resource units in a multi-user CSM domain designated for self-interference averaging in a system band, among the multiple layers are configured in such a manner that different permutation schemes are applied to the layers.

20. The method of claim 19, further comprising:
receiving allocation information indicating the multi-user CSM domain and permutation information indicating the different permutation schemes according to the layers from the BS.

21. The method of claim 15, further comprising:
receiving channel allocation and layer allocation information indicating a resource domain and a layer, which are allocated to each of the multiple MSs, from the BS.

22. A Mobile Station (MS) apparatus for operating multi-user Collaborative Spatial Multiplexing (CSM) in a wireless communication system, the MS apparatus comprising:
an MAP receiver configured to receive channel allocation information according to uplink transmission scheduling from a Base Station (BS) through a MAP message, wherein the channel allocation information indicates that multiple MSs are allocated to multiple layers spatially discriminated for the multi-user CSM such that a first layer is allocated a first MS and a second layer is allocated to at least one second MS;
an encoder configured to encode uplink data desired to be transmitted; and
a multiplexer configured to permutate resource units allocated to the MS based on the channel allocation information by applying a relevant permutation scheme to a layer allocated to the MS among the multiple layers such that self-interference values between the first MS in the first layer and the at least one second MS in the second layer are averaged, map the encoded data into the permutated resource units, and transmit the encoded data mapped into the permutated resource units to the BS,
wherein the multiplexer is configured to permutate the resource units by changing an array of indexes of the resource units according to a permutation scheme of each layer.

23. The MS apparatus of claim 22, wherein the multiple layers are configured in such a manner that a permutation equation that includes different offsets according to the layers as inputs is applied to the multiple layers.

24. The MS apparatus of claim 22, wherein the multiple layers are configured in such a manner that different permutation equations are applied to the multiple layers according to the layers.

25. The MS apparatus of claim 22, wherein the first layer among the multiple layers is configured in such a manner that a first permutation scheme, which is substantially the same as a permutation scheme used when the multi-user CSM is not applied, is applied to the first layer, and the second layer excluding the first layer among the multiple layers is configured in such a manner that at least one second permutation scheme, which is different from the first permutation scheme, is applied to the second layer.

26. The MS apparatus of claim 22, wherein layers, which are allocated to resource units in a multi-user CSM domain designated for self-interference averaging in a system band, among the multiple layers are configured in such a manner that different permutation schemes are applied according to the layers.

27. The MS apparatus of claim 26, further comprising:
a control information receiver configured to receive allocation information indicating the multi-user CSM domain and permutation information indicating the different permutation schemes according to the layers from the BS.

28. The MS apparatus of claim 22, wherein the MAP message further includes channel allocation and layer allocation information indicating a resource domain and a layer allocated to each of the multiple MSs.

\* \* \* \* \*